June 26, 1923.
G. J. BARRETT
COMBINED TYPEWRITING AND ADDING MACHINE
Filed Dec. 13, 1909     11 sheets-sheet 4
1,459,814
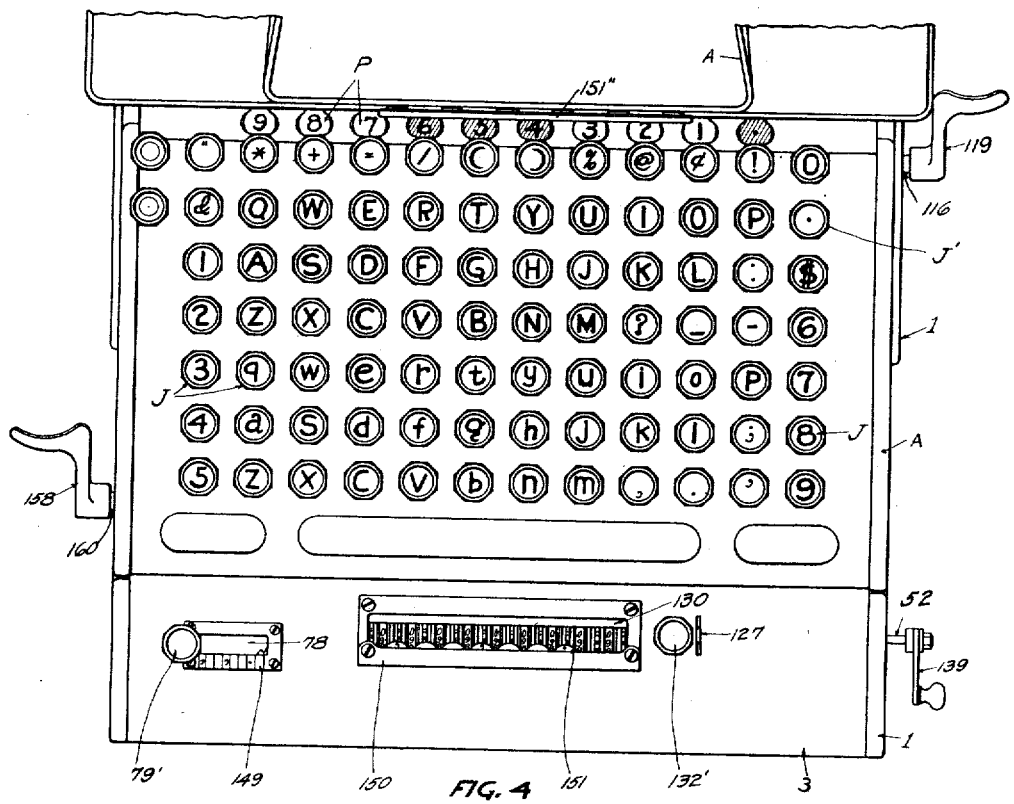

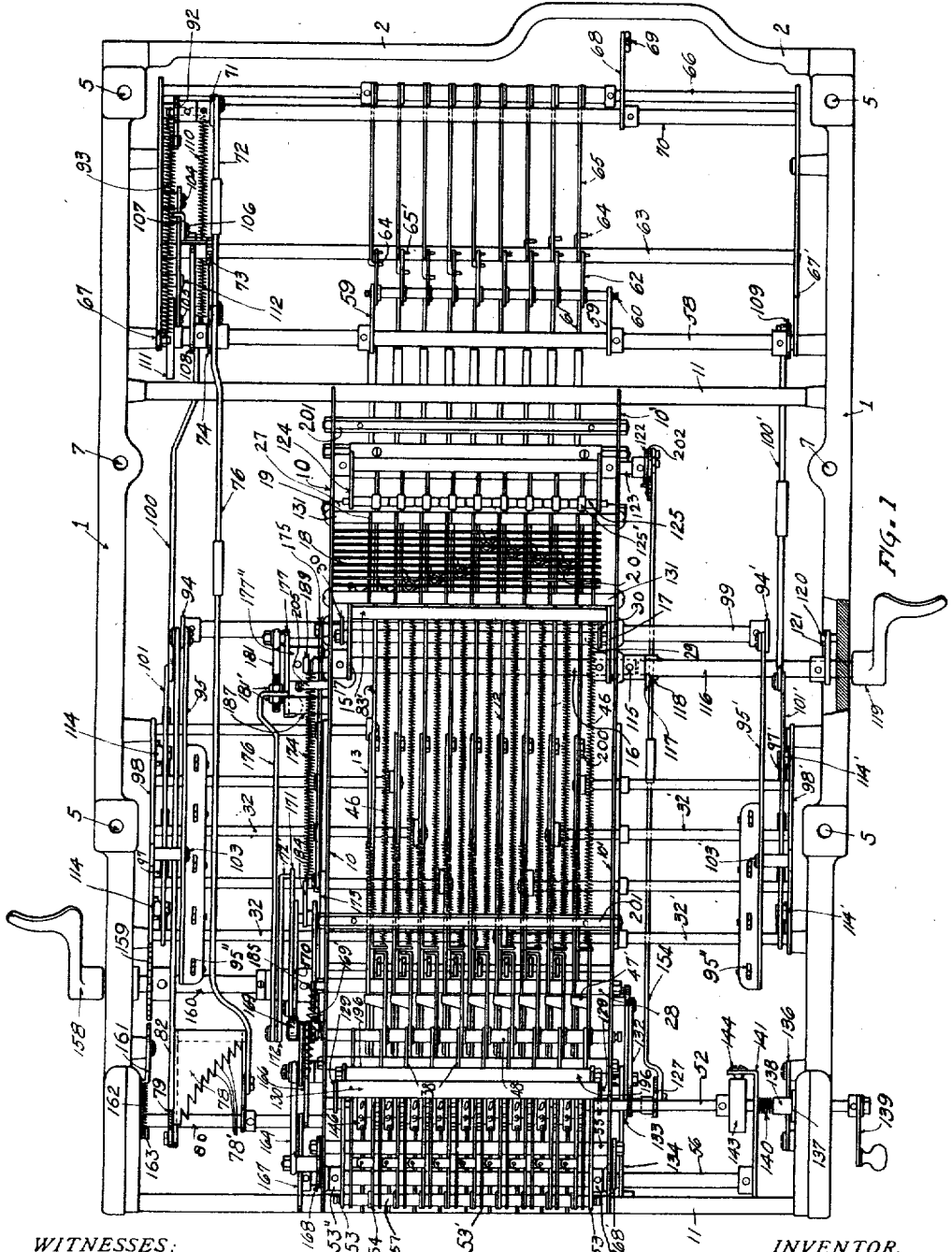

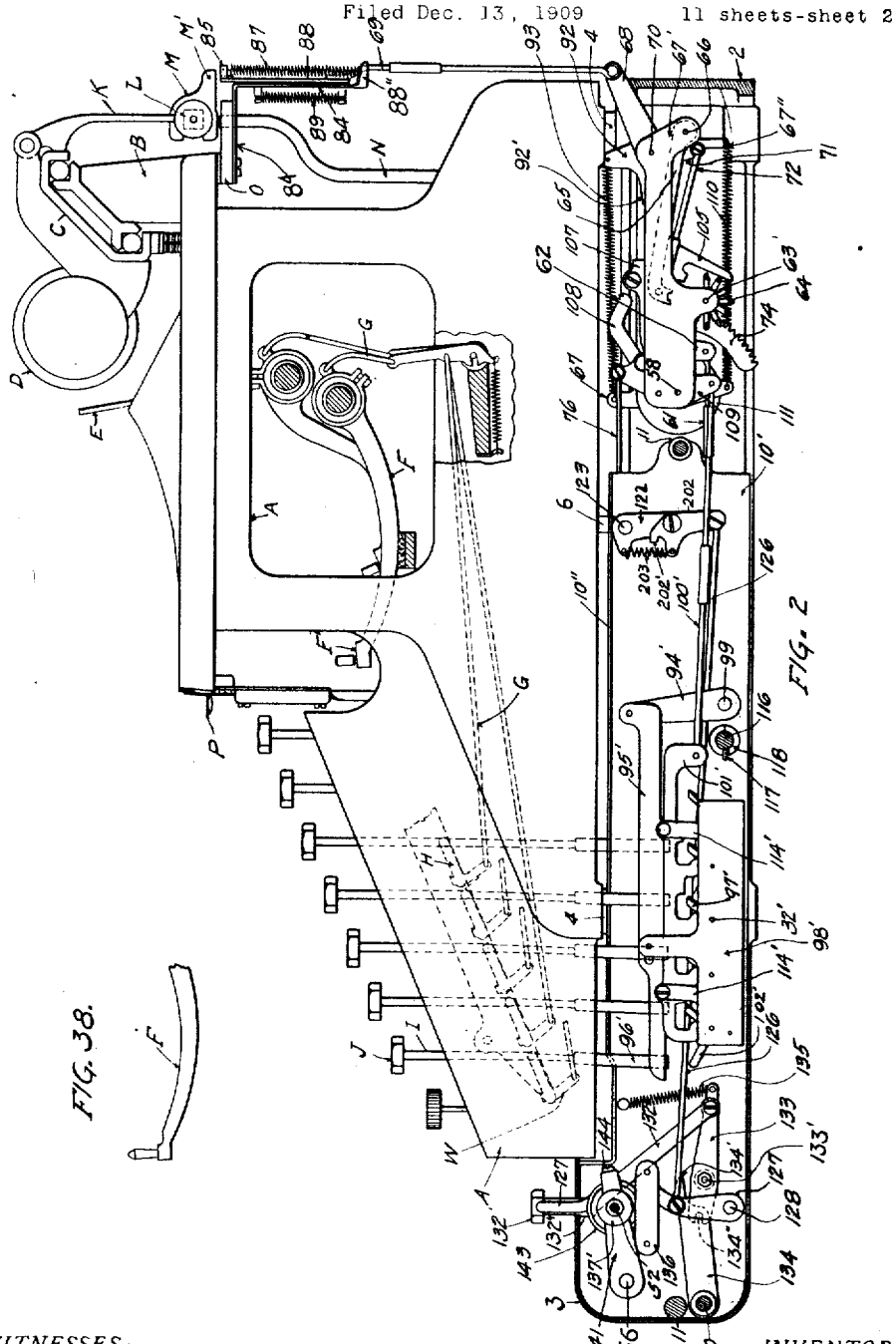

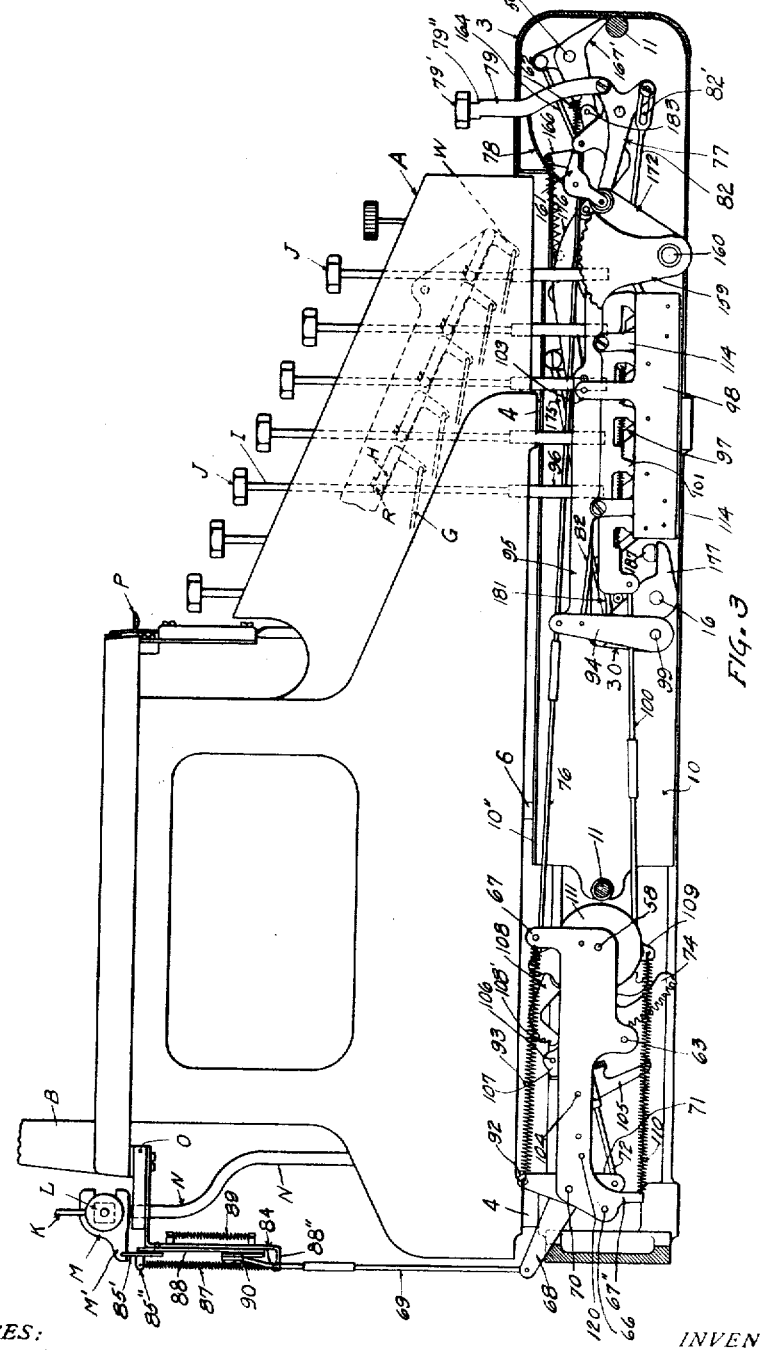

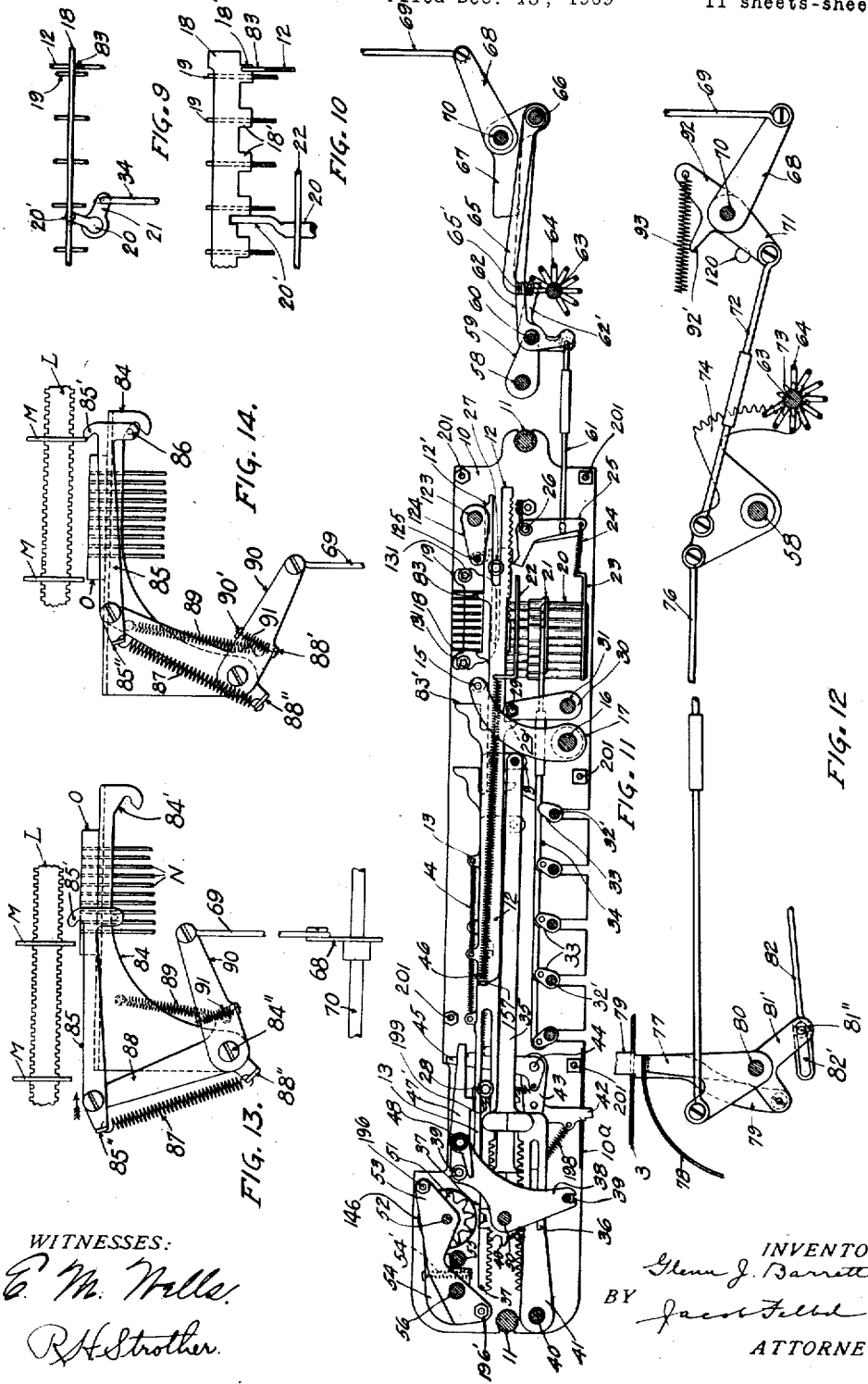

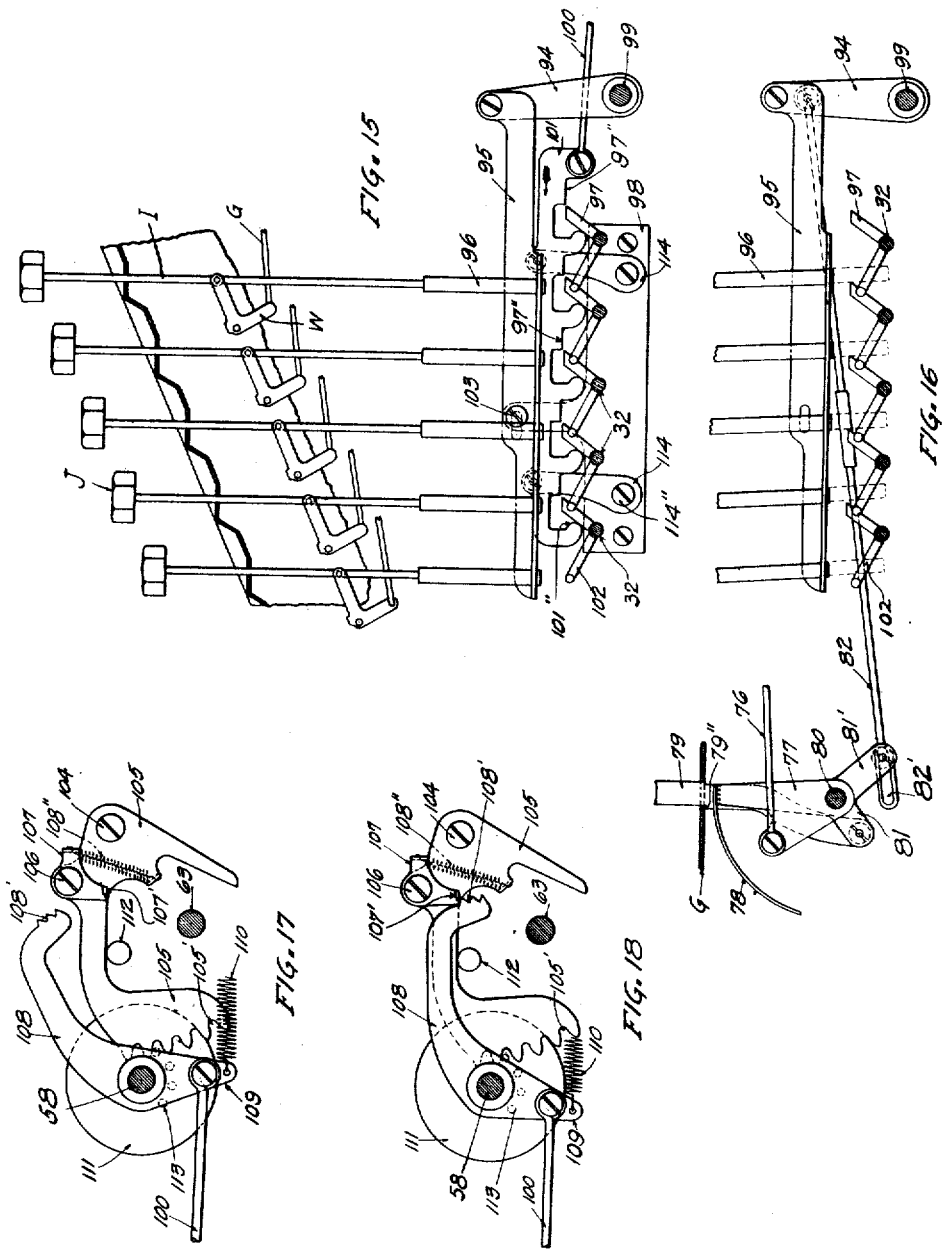

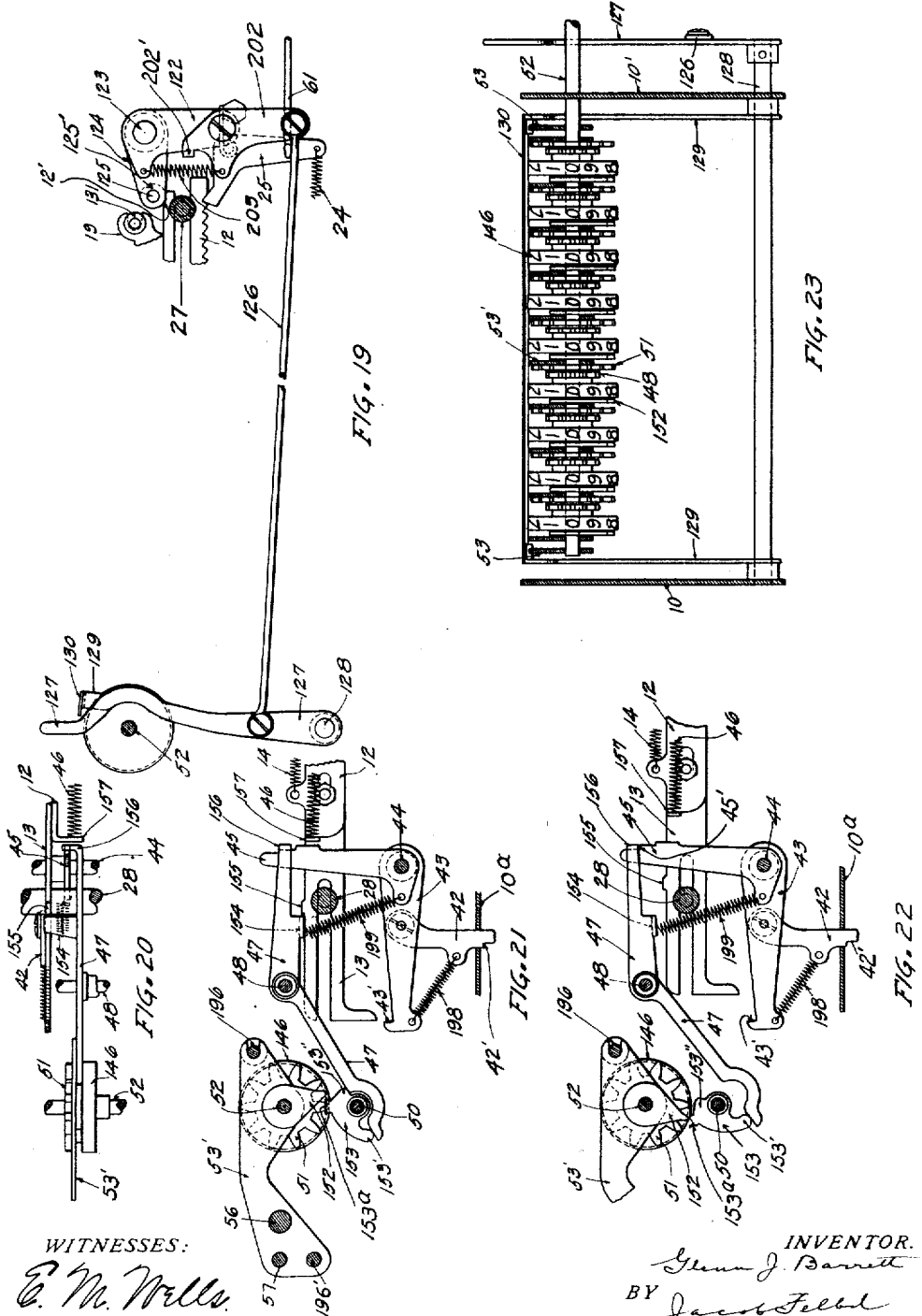

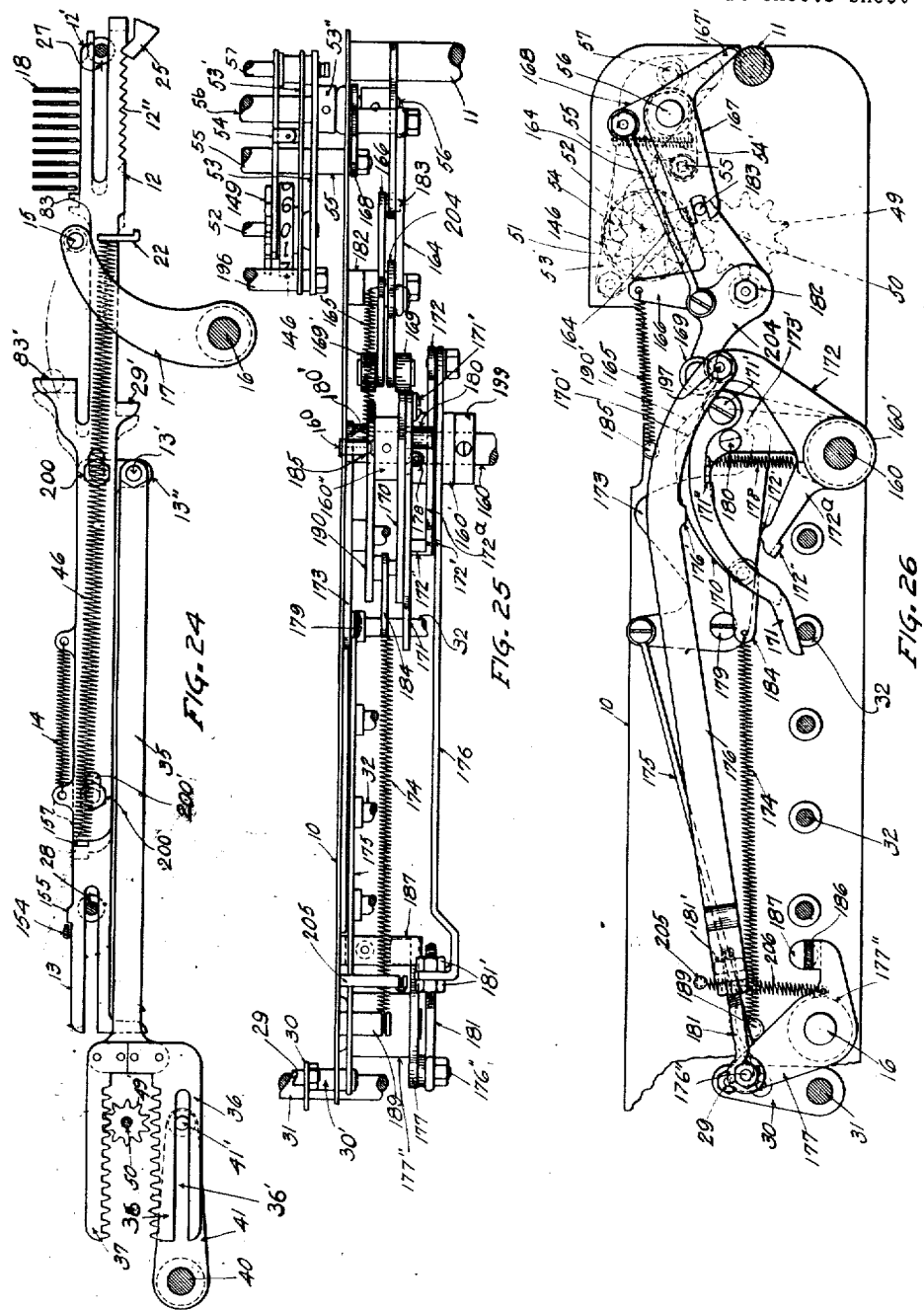

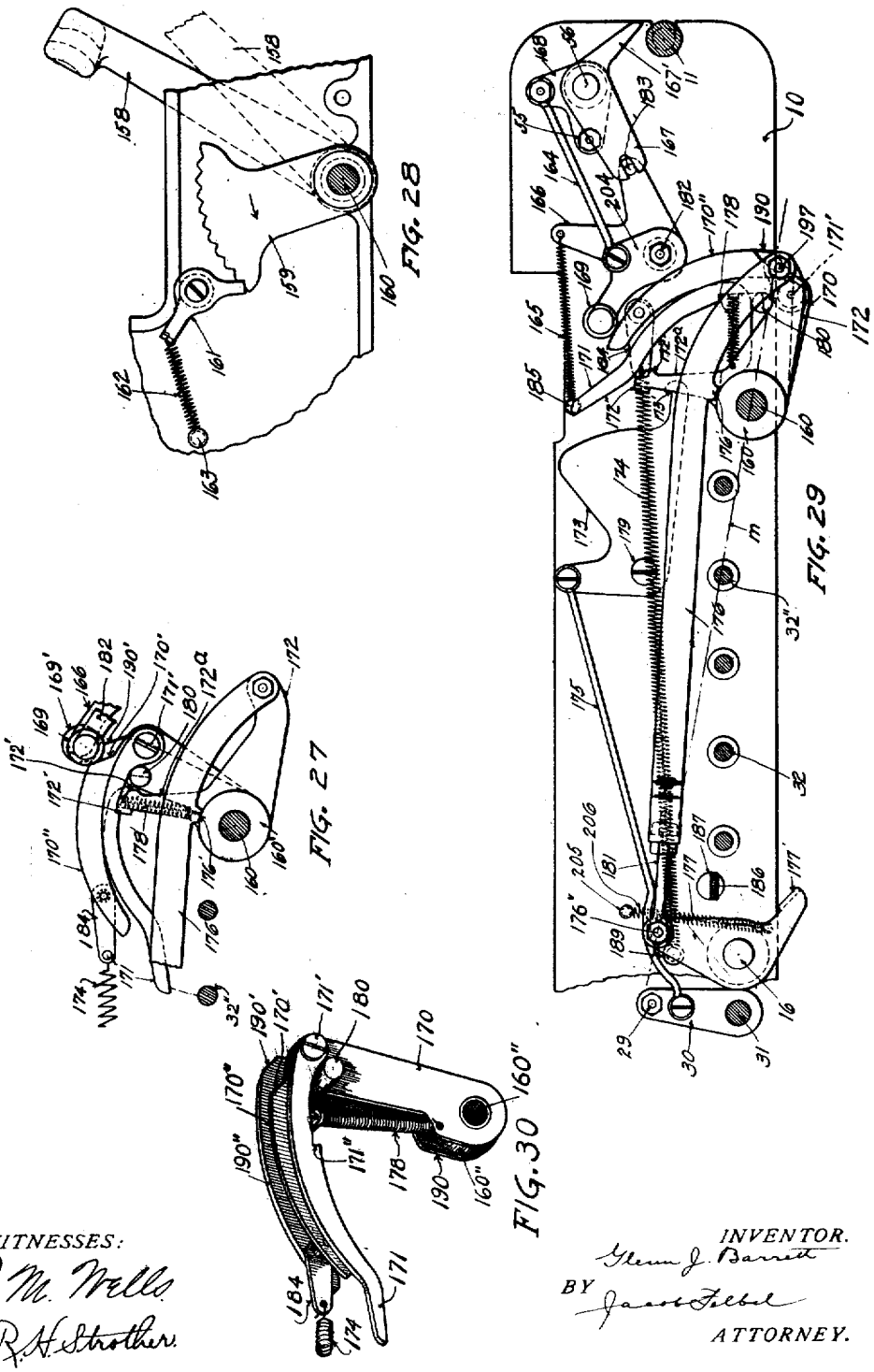

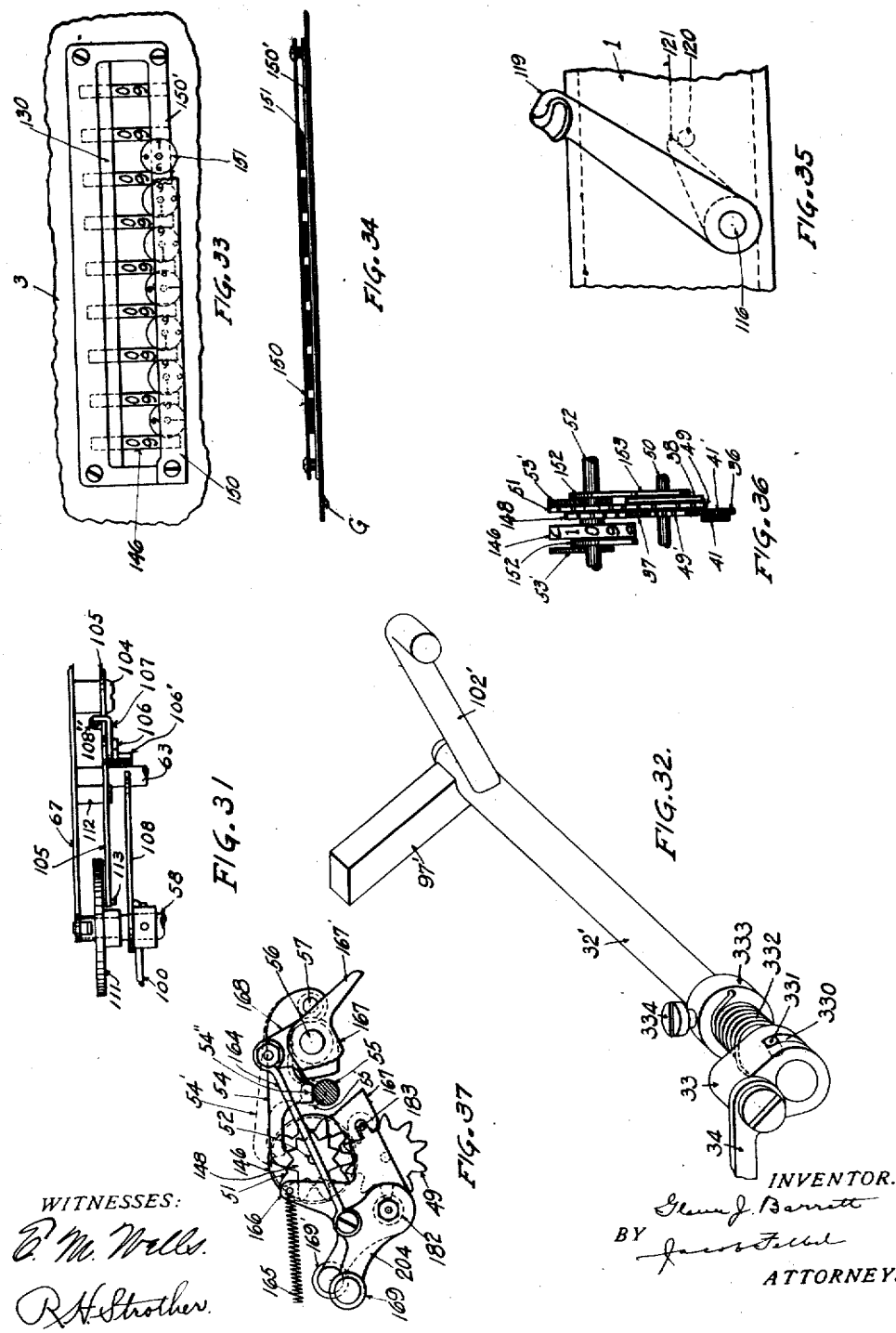

June 26, 1923.

G. J. BARRETT 1,459,814

COMBINED TYPEWRITING AND ADDING MACHINE

Filed Dec. 13, 1909     11 sheets-sheet 11

WITNESSES.
L. Nelson
R. H. Strother

INVENTOR.
Glenn J. Barrett
By Jacob Felbel
HIS ATTORNEY

Patented June 26, 1923.

1,459,814

UNITED STATES PATENT OFFICE.

GLENN J. BARRETT, OF GRAND RAPIDS, MICHIGAN, ASSIGNOR, BY MESNE ASSIGNMENTS, TO REMINGTON TYPEWRITER COMPANY, OF ILION, NEW YORK, A CORPORATION OF NEW YORK.

COMBINED TYPEWRITING AND ADDING MACHINE.

Application filed December 13, 1909. Serial No. 532,889.

*To all whom it may concern:*

Be it known that I, GLENN J. BARRETT, citizen of the United States, and resident of Grand Rapids, in the county of Kent and State of Michigan, have invented certain new and useful Improvements in Combined Typewriting and Adding Machines, of which the following is a specification.

My invention relates to adding machines. My invention relates also to combined typewriting and adding machines.

My invention has for one of its principal objects to provide key set adding mechanism to add and subtract numbers written on a typewriter, and preferably said adding mechanism becomes operative by the ordinary operation of the typewriter in writing numbers.

Another object is to provide an improved denomination selecting mechanism, the selecting devices for which are controlled by the typewriter carriage.

Another object is to provide simple operating devices for the accumulating mechanism requiring a minimum of power. I have also provided certain interlocking devices, and numerous improvements, both in the adding mechanism itself and also in the connections between the adding and the typewriting mechanism.

My invention consists in certain features of construction and combinations and arrangements of parts, all of which will be fully set forth herein and particularly pointed out in the claims.

A structure embodying my invention is shown in the accompanying drawings in which,—

Figure 1 is a general plan view of the adding machine portion of my invention, with the covers and the typewriter and depending parts removed.

Figure 2 is a right-hand side elevation showing a general outline of the typewriter, a portion of the denomination selector attached to the typewriter, and a general side view of the adding machine proper with the right side of the main frame removed, exposing, particularly, the connections to the typewriter.

Figure 3 is a view similar to Figure 2 with the exception that it is taken from the left side of the machine instead of from the right.

Figure 4 is a plan view of the typewriter keyboard, together with the forward portion of the adding machine case, operating handles, etc.

Figure 5 is a fragmentary top view, partly in section, showing the register wheel shaft, some of the register wheels and the details of the dial resetting devices.

Figure 6 is a left end view of one of the dials showing the resetting pawl mounted therein and engaged by the shaft for resetting by said shaft.

Figure 7 is a view similar to Figure 6 except that the parts are shown in their normal positions with the resetting pawl out of engagement with the shaft.

Figure 8 is a rear view of the shaft-positioning cam shown in Figure 5, this view being taken looking in the direction of the arrow shown in Figure 5.

Figure 9 is a fragmentary top view of a portion of one of the sliding stops for positioning the setting-up racks, together with a top view of the actuating arm therefor, and also a portion of one of the setting-up racks.

Figure 10 is a front view of some of the parts shown in Figure 9, partly in section.

Figure 39:
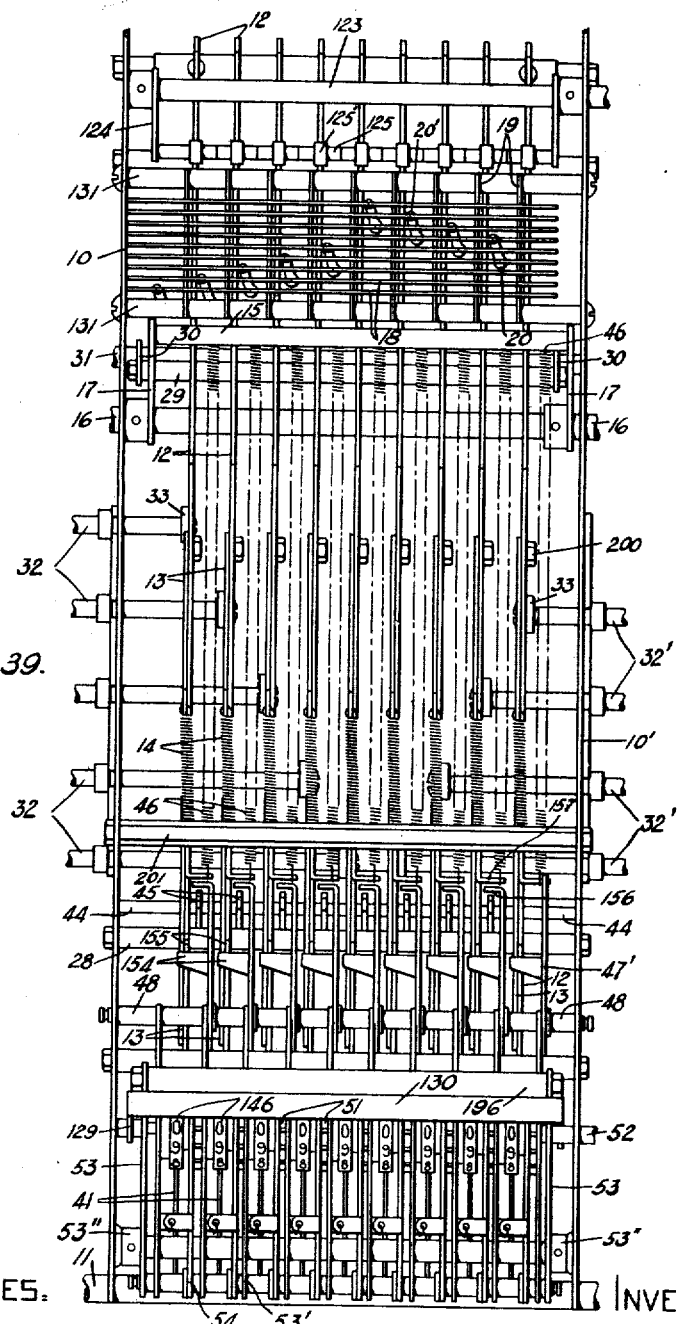

Figure 11 is a general side view of the main adding machine mechanism, the right side plate of the auxiliary frame being removed, and also a right side view of the lower portion of the denomination selecting mechanism, parts being omitted and parts shown in section. This view shows the parts in the positions they occupy when the typewriter carriage is in the position of the lowest denomination and the "9" numeral key is depressed.

Figure 12 is a fragmentary side view of a portion of the denomination selecting mechanism showing a connection forward to a denomination indicator and a lock for holding the adding machine mechanism out of co-operative relation with the typewriter.

Figure 13 is a rear view of the upper portion of the denomination selector showing a tabulator stop and rack carried by the typewriter carriage, together with portions of the sliding decimal stops of the tabulator mechanism.

Figure 14 is a view of the selector mechanism shown in Figure 13 in position for the lowest denomination, and about to return to normal position.

Figure 15 is a side view of the connections between the typewriter finger keys and the setting mechanism of the adding machine, with parts broken away and parts in section.

Figure 16 is a fragmentary side view of the switching mechanism for throwing the numeral keys of the typewriter out of operative engagement with the digit setting mechanism together with connections forward to the denomination indicator and the lock for holding such switching mechanism in the position shown.

Figure 17 is a side view of a governor or retarder for momentarily holding the digit rack releasing mechanism in order that the racks may become properly set, the parts being shown in normal position.

Figure 18 is a side view of the governor shown in Figure 17, the parts being positioned by a finger key depressed to its limit.

Figure 19 is a fragmentary side view of the dial shield which covers the dials the instant any rack is positioned, together with portions of a rack and the co-operating parts, and a right side view of the dials.

Figure 20 is a fragmentary plan view of the carrying mechanism, with portions of the co-operating parts.

Figure 21 is a fragmentary side elevation of the carrying mechanism and co-operative parts, in normal position.

Figure 22 is a view of the parts shown in Figure 21 just after the dial to the right of the one shown, has passed the carrying point, the digit setting rack being shown in position to be picked up during the operation of the operating handle.

Figure 23 is a front view of the dials, together with the dial shield and its supports, parts being shown in section and parts omitted.

Figure 24 is a side view of one of the digit racks and the "pick up" bail, showing the position of the rack with reference to the driving pinion for the operation of subtraction.

Figure 25 is a plan view of the parts shown in Figure 26.

Figure 26 is a left-hand side view of the operating mechanism and showing also a certain locking device, the parts being shown in normal position.

Figure 27 is a fragmentary side view, partly in section, of the main driving shaft and parts of the operating mechanism, the parts being shown in the positions they occupy at a certain point in the return stroke of the handle.

Figure 28 is a side view of the full stroke device for the operating handle.

Figure 29 is a view of parts shown in Figure 26, but in the positions they occupy when the operating handle is at the limit of its forward stroke.

Figure 30 is a perspective view of the dial and detent operating cams and associated parts.

Figure 31 is a top view of the governor or retarding device shown in Figure 17.

Figure 32 is a perspective view of one of the rock shafts which are operated by the numeral keys.

Figure 33 is a fragmentary top view showing the sight opening of the register and the punctuation disks and their mountings.

Figure 34 is a front view, partly in section, of said punctuation disks and their mountings.

Figure 35 is a side view of the correction lever situated on the right-hand side of the machine.

Figure 36 is a front view, partly in section, of a register wheel, its driving pinion and rack and associated parts.

Figure 37 is a right end view of a portion of the register and part of its operating mechanism, some of the parts being broken away to expose the dial detent arm.

Figure 38 is a fragmentary side view of a special type bar for writing a punctuation point, such as the period or comma.

Figure 39 is a top plan view corresponding to the middle part of Fig. 1 but on a larger scale.

Similar letters of reference refer to like parts throughout the several illustrations.

The form of typewriter to which my invention is attached, is immaterial. In the several illustrations herewith, for the sake of illustration, I have shown it in combination with a Smith Premier No. 10 typewriter.

The regular numeral keys of the typewriter are utilized in my invention, there being practically no difference in the "touch" when setting up a digit to be added, from the "touch" of the other characters of the key-board.

The adding machine mechanisms may be thrown out of co-operative relation with the typewriter, by pressing down and locking the finger button 79' (Fig. 4), which disconnects the numeral finger keys and the carriage of the typewriter from the adding machine mechanism, as will be hereinafter explained.

The printing of the numeral in the regular manner when the adding mechanism is operative, does not operate the dials, carrying devices, etc., but merely sets up the numerals to be added, or subtracted, after which it may be accumulated upon or subtracted from said dials by drawing forward the operating handle 158 at the left side of the machine. If, after setting up a numeral, it is seen that a mistake has been made, the "set" may be destroyed by drawing forward the correction lever 119 at the right side of the machine. This restores the racks, which have been placed in the operation of setting, to normal positions again. The instant a numeral is set up, the dials are covered by the shield 130 which is adapted to swing forwardly for this purpose, and a reading cannot be had until the handle 158 is pulled and the number previously set up, accumulated into the machine, or said shield crowded back by means of the lever 127 which might be necessary when it is desired to copy some reading on the dials before pulling the handle. If the carriage be moved backward toward a higher denomination after a digit rack has been placed and a higher digit printed in the place of the one already in the machine at that denomination, the "set" will be changed to the higher digit; but if the second digit be a lower one, then the operating handle 158 becomes locked and cannot be moved until the correction lever 119 restores the parts to normal position.

The machine is capable of both addition and subtraction being controlled in this respect by the button 132'. The operation of this button 132' may take place at any time before starting to pull the handle 158. In the ordinary operation of the machine, when it is desired to copy a total, the machine is set for subtraction and if the correct reading be copied, pulling the handle 158 will restore the dials automatically to "0". If, however, a mistake has been made in copying, and a numeral is still seen in the dials, then the button 132' may be returned to normal position and the amount actually copied be set up and added into the dials, which will restore them to the number originally upon them and which should have been copied. If it be desired to copy a total and not destroy the reading upon the dials, the button 79' should first be locked down.

The denominating or denomination selecting is automatically goverened by the position of the typewriter carriage, there being certain predetermined spaces through which the carriage passes wherein it is possible to set up a number, which spaces are called "adding zones." These adding zones may be placed anywhere at the wish of the operator, and there may be as many of them as it is convenient to have in the travel of the carriage. Thus items may be correctly added along on one line as well as in a column. Depression of the button 79' renders all of the adding zones inoperative.

Having outlined the operation of my invention in general, I will now give a more detailed description of the same.

The invention is applicable or adaptable to any form of typewriting machine but I have here shown it applied to the typewriter known commercially as the Smith Premier No. 10. This machine comprises a main frame A from which rise standards B which support a carriage C having a roller platen D mounted thereon. Said carriage is drawn across the machine in the manner usual in typewriters by means of a main spring (not shown), and the step-by-step motion of said carriage is controlled by an escapement which is operated by a lever or small universal bar E adjacent the printing point, which in this machine is on the front face of the platen. The carriage feed mechanism is more fully shown in the patent to Alexander T. Brown No. 903,444 dated November 10th, 1908. As is also more fully shown in said patent, there is a series of front-strike type bars F, only two of which are indicated in Figure 2 of the present drawings. These type bars F are operated by a linkage G which connects said type bars to bell crank key levers H in the key-board of the machine, said key levers being operated by the stems I of character or printing keys J. By reference to Figure 4 it will be seen that these character keys include capitals and small letters, numerals and various other characters, so that the machine is adapted to write any words or numbers. The carriage C has depending from the rear thereof two arms K which support a tabulator rack or column stop bar L upon which there is mounted one or more column stops M. The bar L is formed as usual with a series of notches spaced a letter space distance apart, and each of said stops M can be adjusted in the usual manner to any desired letter space position along said bar. The column stops M co-operate with a series of denominational stops N which are guided at their upper ends by a guide plate O. These denominational stops are connected by a series of levers in the base of the machine to a series of tabulator keys P arranged just above the printing key-board of the typewriter. Said levers also operate a universal bar which effects a release of the carriage from the control of its escapement so that when one of the keys is depressed the carriage runs freely until it is arrested by the operated denominational stop co-operating with one of the column stops M. I have not shown this tabulator fully as the details of its construction form no part of my invention and said details are immaterial to my invention. The tabulator actually employed in this machine and partially shown in the drawings, is fully shown and described in the French patent to Alexander T. Brown, No. 388,859, dated March 14th, 1908.

In combining my adding machine with the typewriter the frame of the typewriter is mounted on the frame of the adding machine so that most of the adding mechanism is beneath the typewriter.

The main frame of the adding machine comprises side plates 1 which are connected together at their rear ends by a back plate 2. These side plates are also connected together by two frame rods 11 (Figure 1) and also by a cover plate 3 for the front part of the adding machine where it projects out in front of the frame of the typewriter. Said typewriter frame is supported on the side plates 1 by means of interposed short posts 4, each having a reduced part that fits into a hole 5 (Figure 1) in the side plate 1 and another part that fits into the portion of the typewriter frame which is ordinarily occupied by the rubber feet on which typewriters are usually mounted. The two frames are connected together by screws 6 which pass upward through holes 7 in the side plates 1 and are threaded into suitable holes in the frame of the typewriter. The register and most of the mechanism which immediately co-operates therewith, is supported in an auxiliary frame or casing comprising side plates 10 and 10′ which are supported on the frame rods 11 by open ended slots formed in the ends of the plates 10, 10′. This auxiliary frame is also provided with a cover plate 10″ (Figure 3) and it may also be provided with a bottom plate so that most of the more delicate mechanism of the machine is enclosed in a box which protects it from dust. The side plates 10 and 10′ of this auxiliary frame are connected together by several frame rods, some of which, marked 201, are shown in Figures 1 and 11 and others of which will be referred to later on.

In the typewriter shown in the drawings the numeral keys are arranged in two rows at the sides of the key-board, those keys adapted to write the digits "1," "2," "3," "4," and "5" being at the left-hand side of those keys adapted to write the digits "6," "7," and "8" and "9" being at the right-hand side of the key-board, all as shown in Figure 4. The key stems I are pivoted at R to the bell cranks H and to each of the said bell cranks for the numeral keys, there is pivoted a depending plunger 96 which extends down into the adding machine and constitutes a connection between the typewriter keys and the adding mechanism. These plungers are guided in the adding machine by passing through suitable slots 95″ in guide plates 95 and 95′, one situated at the left and the other at the right-hand side of the machine. Below said guide plates there is pivoted a series of five rock shafts 32 at the left-hand side of the machine and four rock shafts 32′ at the right-hand side of the machine, said rock shafts having arms 102 (Figures 15 and 32) adapted to be struck by the lower ends of the bars 96, 96′ when the keys are depressed. The construction is such that when any numeral key is depressed one of these rock shafts is rocked toward the front of the machine. The rock shafts 32 are pivoted at their outer ends in a frame plate 98 which is secured by screws to lugs projecting from the left-hand frame plate 1; and said rock shafts are also journaled in the side plate 10 of the auxiliary frame. The rock shaft 32′ are journaled in the side plate 10′ of the auxiliary frame and in a frame plate 98′ secured to lugs of the right-hand side plate 1. As shown in Figure 1 the shafts 32, 32′ are of different lengths so that their inner ends terminate at different points transversely of the machine. At its inner end each of the rock shafts 32, 32′ is provided with an upstanding arm 33 (Figures 11 and 32) and to each of said arms is pivoted a rearwardly extending link 34 which at its rear end is pivoted to an arm 21 (Figures 9, 10 and 11) of one of a series of vertical rock shafts 20, the arrangement of which will be understood by reference to Figures 1 and 11. The rock shafts 20 (Figure 11) are journaled at their lower ends in a frame plate 23 supported at its ends by the side plates 10, 10′ and the upper parts of said shafts are journaled in a similar horizontal frame plate 22. As shown in Figures 9 and 10, each of the rock shafts 20 has its upper end formed into a crank or eccentric part 20′ which works in a notch in the lower edge of one of a series of nine stop slides 18. As shown in Figures 1 and 11, the slides 18 extend transversely of the auxiliary frame, being mounted in slots in a series of partition plates 19 which are mounted in frame rods 131 which connect the frame plates 10, 10′, the partition plates 19 being suitably spaced apart, as for example, by collars strung on the rods. The construction is such that when the numeral key is depressed, one of these slides 18 is moved a short distance toward the right.

The slides 18 constitute stops for a series of sliding bars 12 which lie beneath the slides 18 and extend thence toward the front of the machine and have connected therewith the rack bars which operate the register wheels. The construction and mounting of these bars 12 will be described later on. Each of them has however a projection or lug 83 projecting from its upper edge and normally standing in front of the foremost one of the slides 18; and this lug is adapted to co-operate with a series of downward projections 18′ (Figure 10) formed on the under side of each of the stop slides 18. It will be understood that there is one of these stop projections 18' for each of the slides 12 and that there is one slide 12 for each register wheel. When one of the numeral keys is depressed and the corresponding slide 18 is moved toward the right, it brings the several stop projections 18' into the paths of the corresponding stop lugs 83 of all of the slide bars 12. Means are provided for normally holding the slide bars in their forward positions and for releasing them one at a time as the keys are depressed and the typewriter carriage steps through the adding zone.

The slide bars 12 and some of their co-operative parts are best shown in Figures 1 and 24. Each of said slide bars has two slots 200' formed therein and elongated longitudinally of the slide bar. Bolts 200 project from a companion slide bar 13, the construction being such that the bars 12 and 13 are free to move longitudinally one with relation to the other to an extent limited by the length of the slots 200'. These two bars are connected by a spring 14 which normally holds them in the relative positions shown in Figure 24. The bar 13 has an elongated slot in its forward end which receives a frame rod 28 that joins the two side plates 10 and 10' and the bar 12 has a similar slot at its rear end which co-operates in a similar fashion with the frame rod 27. The rods 27 and 28 are peripherally grooved so as to guide the bars 12 and 13. It will be seen that these two bars 12 and 13 form in effect a compound slide bar, the two parts of which are connected by pin-and-slot connection and by the spring 14. A long spring 46 is connected at its forward end to an ear 157 on the bar 12 and the rear end of said spring is connected to the upturned forward edge of the frame plate 22, this spring tending to slide the bars 12, 13 toward the rear of the machine. Each of the bars 13 has depending from its rear end an ear 13'' to which is pivoted at 13' a forwardly extending bar 35 having riveted to its forward end two racks 36 and 37, the former of which is adapted to engage the under side and the latter of which is adapted to engage the upper side of a pinion 49', loosely mounted on a shaft 50. The racks 36 and 37 and the bar or pitman 35 are adapted to be moved up and down to engage one or the other of the racks with the pinion 49' by means which will be hereinafter described. The machine is adapted for addition when the rack 36 meshes with the pinion 49' and for subtraction when the rack 37 meshes with said pinion, all as will appear more clearly hereinafter.

The bars 12, 13 are normally held in their forward positions as shown in Figure 24 by means of a series of pawls 25 engaging teeth 12'' formed on the under sides of the bars 12. When the typewriter carriage is in the adding zone one of these pawls 25 is released upon each depression of a numeral key by means which will now be described.

The connections to the typewriter carriage are best shown in Figures 2, 3, 13 and 14. A bracket 84, consisting of a plate of sheet metal bent at right angles, is secured to the guide plate O of the denomination stops N, and at its lower end said bracket has pivoted thereto at 84'' a lever 88 to the upper end of which is pivoted a horizontally disposed arm, draw plate or coupling bar 85 having at its free end a hook-like projection 85' which stands in the path of a nose or projecting part M' of the column stop M. The free end of the draw plate 85 is normally held up in the position shown in Figure 13 by means of a spring 87 connected to an ear 85'' of said draw plate and to an ear 88'' of the bracket 84. The upward motion of the arm 85 under the impulse of the spring 87, is limited by a pin 86 which projects toward the front of the machine from the free end of the arm 85 and which is guided by the lower edge of a prolongation of the plate 84. The construction is such that when the carriage reaches the adding zone and the stop M reaches the field controlled by the denominational stops N, said stop M will contact with the hook 85' and will draw the bar 85 and lever 88 step-by-step with the typewriter carriage. The guide edge of the plate 84 is formed with an inclined part 84' which guides the pin 86 downward as the carriage passes out of the adding zone, thus drawing the hook 85' down to a position where it is free of the stop M as will be understood by reference to Figure 14. When the hook 85' escapes from the column stop the lever 88 is thrown back to normal position by a spring 89 which is connected at its upper end to the bracket 84 and at its lower end to the lever 88. The stop M and the typewriter carriage are then free to move on without further affecting the adding machine. It will of course be understood that the column stop M is adjustable to any letter space position along the bar L so that the adding zone can be located at any position in the line of writing and words or numbers may be written either before or after the adding column. It will also be understood that any suitable number of these column stops M may be provided and each one situated as desired, thus locating a plurality of adding columns or zones on the paper in the machine. I have shown two such stops in Figures 13 and 14, but any suitable number can be used, and all of the numbers written in the zones determined by these stops, will be added, but numbers written elsewhere will not affect the adding machine.

The arm 88 constitutes in effect one arm of a bell crank lever, the other arm 90 of which is pivoted on the same screw 84" as the arm 88. For reasons which will presently appear, these two lever arms are not rigidly connected but are connected by a spring 91 secured at one end to an ear 90' of the arm 90 and at the other end to an ear 88' projecting from the lever 88. The tension of the spring 91 normally keeps the arm 90 pressed down against the ear 88' so that the two arms 88 and 90 move in unison except as will be explained hereinafter. The arm 90 has pivoted thereto the upper end of a link 69, the lower end of which is pivoted to the rear end of an arm 68 rigidly secured to a transverse shaft 70 which is pivoted in the framework of the adding machine. The construction is such that as the typewriter carriage passes through the adding zone, the arm 68 is moved downward. As will be understood by reference to Figures 1, 2 and 3, two frame plates 67 and 67' are secured to lugs projecting inward from the left-hand and the right-hand side plates 1, respectively; and the shaft 70 is journaled at its ends in these frame plates. As will be seen by reference to Figures 1 and 12, the shaft 70 has mounted on its left-hand end a plate 92 to which is connected the rear end of a spring 93 which is adapted to restore said shaft and the parts connected therewith to normal position when the typewriter carriage passes out of the adding zone. This plate 92 has an arm 92' projecting therefrom which is adapted to engage a stop pin 120 projecting from the plate 67 to limit the motion of the shaft 70 and its connected parts under the impulse of the spring 93. As is shown in Figures 1, 2 and 12, the shaft 70 has rigidly mounted thereon an arm 71 which is connected by a link 72 to a segment 74 loosely mounted on a rock shaft 58 which is journaled at its ends in the frame plates 67 and 67' so that said segment 74 is rocked in unison with the shaft 70 but in the opposite direction. The teeth of the segment 74 mesh with a pinion 73 rigid on a shaft 63 which is journaled at its ends in the frame plates 67 and 67'. The shaft 63 has near the middle part thereof, as shown in Figure 1, a spirally arranged series of pins 64 which are adapted to serve as abutments or interponents to obstruct and modify the motion of certain key operated parts as will presently appear. The pins 64 do not extend entirely around the shaft 63 but there is left a vacant space as shown in Figure 12. These pins are so spaced apart that when the carriage is in an adding column at the position of highest denomination the left-hand one of said pins stands vertically above the shaft 63 and the succeeding pins are brought successively to the vertical position as the carriage steps from one denominational position to another. A frame rod 66 mounted in the plates 67 and 67', has a series of arms 65 pivoted thereto and projecting toward the front of the machine, each of said arms being in the vertical plane of one of the pins 64. As best shown in Figure 2 the forward end of each of these arms 65 projects downward and has a notch 65" in its lower end, which notch is adapted to engage the corresponding one of the pins 64 when said pin is in its vertical position and when the arm 65 is depressed. Each of said arms 65 has a pin 65' (Figure 11) projecting from one side thereof and this pin plays in a slot in the free rear end of the horizontal arm of a bell crank lever 62, which lever has also a depending arm connected by a link 61 with the corresponding one of the detents 25, which detents as has been explained, control the denominational slides 12, 13. The bell crank levers 62 are all independently pivoted on a bail rod 60 which is supported at the rear ends of two arms 59 projecting toward the rear of the machine from and rigidly mounted on a rock shaft 58. As will be presently described, this rock shaft is adapted to be rocked at each depression of a numeral key, the rod 60 being depressed at each key depression, carrying with it all of the bell cranks 62 and these carry with them the arms 65. As the arms 59 are substantially parallel with the links 61, this depression of the bell cranks does not affect the detents 25. If the typewriter carriage is in the adding column, however, one of the pins 64 will be standing vertically and the corresponding one of the arms 65 will be arrested by said vertical pin 64 and the rear end of the bell crank will also be arrested by the pin 65'. As this end of the bell crank has its motion obstructed and cannot move down with the rod 60, the pin 65' becomes the temporary fulcrum of the bell crank and the point 60 of said bell crank is depressed, with the result that the vertical arm of the bell crank is moved toward the rear of the machine, thus operating the link 61 and the corresponding detent 25 and releasing the corresponding slide bar 12. The arms 65 and bell cranks 62 constitute a sort of "feelers," the whole series of which is operated at each key depression. When one of these feelers is obstructed by a pin 64, its motion is so modified as to cause it to operate the corresponding detent 25.

The same key depression which depresses the rod 60 also moves to operative position one of the slides 18. The selected one of the slide bars 12, being now released, will move toward the rear of the machine under the impulse of its spring 46 until it is arrested by the operated slide 18 after moving one, two or some other number of units distance, depending upon the key depressed. When the key is released the bar 60 rises and releases the detent 25, which returns to normal position; and a little subsequently the slide 18 also returns to normal position. I have so placed the stop lugs 83 and the detents 25 that when the slide 18 returns to normal position the lug 83 escapes past the slide and is arrested at an intermediate position between two of the slides 18 so that this lug does not interfere with the subsequent operation of the slides to set up a digit in another denomination. In Figure 11 the shaft 63 and the connected parts are shown in the positions they occupy when the typewriter carriage is at the lowest denominational position in the adding column and the rock shaft 32' which is connected with the "9" key is shown operated. The slide 12 of lowest denomination is shown arrested by the rearmost one of the slides 18. When the key is released this slide 12 will move a short distance until it is arrested by the engagement of the detent 25, the final position of the lug 83 being just back of the last slide 18.

It will be noted that ordinarily, when the carriage is stepping from one letter space position to another in the adding zone, the shaft 63 is entirely free except for its connections to the draw bar 85 so that this shaft and the parts through which it is operated have no resistance to overcome. The pins 64 do not shift the pawls 25 by the step-by-step motion of said pins from one denominational position to another. If said pins had this or similar work to perform there would be an appreciable amount of resistance to the rotation of the shaft 63 which, through looseness of joints and flexure of parts, might cause some inaccuracy in the step-by-step motion of said shaft. As the shaft turns entirely free from any resistance there is none of this straining or flexure of parts and the shaft is positioned at each step of the typewriter carriage with much greater accuracy than would be the case if said shaft had to overcome some such resistance as that referred to. The arms 33 are preferably not rigidly mounted on the ends of the shafts 32, 32' but are mounted thereon in the manner shown in Figure 32. Each of these arms is loosely mounted on the end of the shaft and the hub of said arm is formed with a slot 330 extending part way around the shaft and a pin 331 projects from the shaft into said slot, said pin preventing motion of the arm 33 lengthwise of the shaft. The arm 33 is controlled by a spring 332 coiled about the shaft and connected at one end to said arm and at the other end to a collar 333 fixed on the shaft by a set screw 334. The spring tends to turn the arm 33 toward the front of the machine, its motion in that direction being limited by the pin 331 contacting with the end of the slot 330. When the shaft is rocked by the depression of a key the arm 33 is operated through the spring 332 until the slide 18 strikes the right-hand frame piece 10' and is arrested thereby, so that the slide 18 is always correctly positioned, even though the different key depressions may vary in extent. If the slide 18 is arrested either in the manner just described or from some accidental cause, the shaft 32 or 32' continues to rock against the tension of the spring 333, the pin 331 moving away from the end of the slot, so that no straining of the parts occurs.

The connections between the rock shaft 58 and the numeral keys will now be described, reference being had more particularly to Figures 1, 2, 3, 15 and 32. As shown in Figures 15 and 32 each of the rock shafts 32, 32' has on its outer end in addition to the arm 102 another arm 97, the latter projecting upward at an inclination toward the rear of the machine. There are two universal bars for co-operation with these arms 97, one universal bar at each side of the machine. As shown in Figures 1 and 15 the left-hand universal bar 101 consists of a horizontally disposed plate having arms or contact projections 101" depending therefrom, one of said projections lying in front of each of the arms 97 so that when any of the rock shafts 32 is operated by its numeral key this universal bar will be moved lengthwise toward the front of the machine. To this end said universal bar is mounted on two upstanding parallel links 114 which are pivoted to the plate 98 by screws 114". The rear end of the universal bar 101 is connected by a link 100 with an arm 109 depending from the rock shaft 58. A similar universal bar 101' is similarly mounted on links 114' at the right-hand side of the machine and is operated by arms 97' on the rock shafts 32'. The universal bar 101" is connected by a link 100' with another arm 109 depending from the right-hand end of the shaft 58. It will be seen that when any key is depressed both of these universal bars will be moved toward the front of the machine, as they are connected to move together through the shaft 58. The shaft 58 and the parts connected therewith are restored to normal position by a spring 110 which is connected at one end to the left-hand arm 109 and at the other end to a pin 67" projecting from the plate 67. When the universal bars return to normal position, they restore to normal position the operated rock shaft 32 and the parts connected therewith, including the slide 18.

It is desirable that the adding mechanism shall lessen the speed of the typewriter mechanism as little as possible. Some typewriter escapements, including the one used in the typewriter shown in the present case, are so constructed that the typewriter carriage begins its stepping motion the instant the type strikes the paper; and with some escapements the carriage is released for its stepping motion before the type strikes the paper. Unless provision was made to the contrary the adding machine might either delay the stepping of the typewriter carriage or if said carriage began to step before the adding operation was complete it might disarrange the adding mechanism and cause the wrong number to be set up therein. I have provided for this as follows:—The notches 65'' in the arms 65 are adapted to hold the pins 64 so as to prevent the shaft 63 from turning until the bar 60 has been raised to or toward its normal position. It is in order that this restraining of the shaft 63 may not interfere with the stepping of the typewriter carriage, that the loose connection between the lever arms 88 and 90 (Figures 13, 14) is provided. This loose connection permits the arm 88 to move with the typewriter carriage while the arm 90 is held stationary by the parts just referred to, the result being that the spring 91 is stretched. As soon as the bar 60 rises, releasing the shaft 63, said shaft steps very quickly to its new position, driven by the spring 91.

As it requires a certain amount of time for the slide bars 12, 13 to be moved toward the rear of the machine by their springs 46, I have provided a governor or retarding device to delay the return of the key controlled parts of the adding mechanism to normal position, this delay or retardation being only for the very brief length of time necessary to allow the slides 12, 13 to complete their motion. This governor or retarding device is best shown in Figures 17, 18 and 31 and its connection with the remainder of the mechanism is best shown in Figures 1 and 3. Near its left-hand end the shaft 58 has projecting therefrom toward the rear of the machine a rigid arm 108, this arm being as shown in the present instance a part of the same lever as the left-hand arm 109 which is connected with the universal bar 101. The arm 108 has formed on its rear end several ratchet teeth 108' which when the shaft 58 is rocked by the depression of the key are adapted to be caught on the ear 107' of a pawl 107 which is pivoted by a screw 106 to a lever 105, which lever is pivoted on a pivot screw 104 which is threaded into the frame plate 67. The pawl 107 is controlled by a spring 108''. The lever 105 has a limited motion determined in one direction by a depending arm thereof which is adapted to engage the shaft 63 and in the other direction by a forwardly extending arm which normally rests on a stop pin 112 projecting from the plate 67. The forward end of this latter lever arm is formed with gear teeth 105' which mesh with teeth 113 on a weighted disk 111 which is journaled on the shaft 58. As here shown the teeth 113 consist of pins inserted in the disk 111. The construction is such that when a key is depressed the arm 108 is moved down by the rocking of the shaft 58 to the position shown in Figure 18 where it is caught by the pawl 107. When the pressure on the key is released and the parts have to be returned by the spring 110, the arm 108 can rise only by raising the pawl 107 and lever 105 which necessitates the setting of the disk 111 into rotation. The return movement of the arm 108 is not checked except at the beginning thereof, as said arm soon escapes from the pawl 107 after which the shaft 58 and connected parts snap quickly to normal position and the lever 105 and disk 111 return to normal position by gravity. The disk 111 is connected with the shaft 58 through compound levers which give said disk a high leverage on the shaft. It will be seen that this retarding device delays for a fraction of a second the first part of the return motion of the shaft 58 and the other key-operated parts to normal position and assures that these parts do not return to normal position until the denominational devices (slides 12, 13) are positioned by their springs. The rock shafts 32, 32' are not provided with returning springs but are restored to normal position by the universal bars 101 and 101' acting on the arms 97, 97'. It will thus be seen that this retarding device also delays the return to normal position of the rock shafts 32, 32' and the slides 18.

In order to prevent the depression of a second key until the key previously depressed has returned to normal position the universal bars 101 and 101' are each formed with a series of stop surfaces 97'' (Figure 15). When the universal bar moves toward the front of the machine all of the arms 97, 97' of unoperated rock shafts 32, 32' are covered by these stops 97'' so that all of the rock shafts except the one that operated the universal bars, are locked in normal position. This makes it impossible to depress any one of the remaining numeral keys far enough to cause its type to print upon the paper and it prevents any operation of the adding mechanism by said key until the key previously depressed has returned so far toward normal position as to permit the universal bars and connected parts to return to normal position: in short until the operation of the adding mechanism by the previously depressed key, is complete.

From what has been said it will be understood that when a numeral key is depressed while the typewriter carriage is in an adding column one of the denominational members 12, 13 corresponding to the denominational position of the typewriter carriage, moves toward the rear of the machine until it is arrested by that one of the stops bars 18 which corresponds with the operated numeral key. When the typewriter carriage has passed out of the adding column all of the key set members 12, 13 are restored to normal position by an operating mechanism to be hereinafter described and it is on their return strokes that they operate the register.

The register is mounted in a pivoted frame carried by and rigidly secured to a rock shaft 56 (Figures 1 and 11), said rock shaft being journaled in the frame plates 10 and 10' near their forward ends. The construction of this frame will be best understood by reference to Figures 1, 11 and 25. Said frame comprises two end pieces 53, each of which has a hub 53'' secured rigidly to the shaft 56 as for example by a pin driven through said hub and shaft. These end pieces 53 extend toward the rear of the machine and at their rear ends they are connected by a rigid frame rod 196. The frame plates 53 also extend from the shaft 56 forward and downward and are connected by a second rigid frame rod 196'. The register wheels or dials 146 are loosely mounted on a shaft 52 which is journaled in the end plates 53. Between each pair of adjacent register wheels there is a partition plate 53' of substantially the same general outline as the end plate 53. These partition plates 53' are strung along the frame rods 196 and 196' where they are suitably spaced apart, as for example, by collars or washers. The register frame also comprises a rod 57 which lies lengthwise of the frame and on which are pivoted the detent pawls 54.

The construction of each register wheel will be understood by reference to Figure 5. From this figure it will be seen that the space on the shaft 52 between two consecutive partition plates 53', is occupied by a sleeve or hub 145 which is journaled on said shaft 52. As here shown the dial 146 is made of sheet metal and is mounted on said hub. Next the dial is a ten-toothed star wheel 148, the form of which is shown in Figure 37, and which co-operates with the detent 54. To the right of this star wheel 148 there is rigidly mounted on the sleeve 145 a gear wheel or pinion 51 by means of which the register wheel is turned. At the left of the dial and at the extreme left-hand end of the sleeve 145 there is a plate or carrying trip 152. Each of the pinions 49' that is engaged by the racks 36, 37 has side by side therewith and rigidly connected thereto a gear 49 with which the corresponding register wheel gear 51 is adapted to mesh, as indicated in Figures 36 and 37. The register frame, however, normally stands in the position shown in Figure 11 with the gears 51 raised out of mesh with the gears 49. The double gears 49, 49', the racks and certain parts of the transfer mechanism, are separated into denominational groups by partition plates 38 (Figure 11) which are mounted on frame rods 39 and through which the shaft 50 and the rod 48 pass. This combination of frame rods and partition plates not only keeps the parts properly spaced transversely of the machine but also enables me to provide a very rigid and at the same time a very light construction.

The register wheels are normally held against rotation by the detents 54, the form of which is best shown in Figure 37. These detents are pivoted on the rod 57 and have hubs which are equal in length to the distance between two consecutive partition plates 53'. The detents 54 are pressed downward into engagement with the star wheels 148 by means of springs 54' (Figure 11), each of which is connected at one end to an ear bent off from the upper edge of the detent 54 and at the other end to an ear bent off from the lower edge of the adjacent partition plate 53'.

The operating mechanism for restoring the key set parts to normal position and for adding or subtracting on the register the number that has been set up by the keys, is controlled by an operating handle 158 (Figure 1) at the left-hand side of the machine. This handle is rigidly mounted on the main rock shaft 160, one end of which is journaled in the left-hand frame plate 1 and the inner end of which is journaled in the frame plate 10 of the auxiliary frame. This handle normally stands at an inclination toward the rear of the machine as shown by dotted lines in Figure 28 and it is operated by drawing it toward the front of the machine. In order to compel a full stroke of the handle to be made a toothed segment 159 (Figure 28) is mounted on the shaft 160 just inside the frame plate 1 and this segment co-operates with a double acting pawl 161 which is controlled by a spring 162 connected at one end to the pawl and at the other end to a stud 163 projecting from the frame plate 1. When the handle starts forward this pawl and segment prevent it from moving backward until it has completed its forward stroke and the pawl has snapped off of the segment. On the return stroke of the handle the pawl is automatically reversed and prevents a forward stroke of the handle until the return stroke is completed.

Referring more especially to Figures 25, 26, 27, 29 and 30, the shaft 160 has rigidly mounted thereon near its inner end a sleeve 160'' which has rigidly mounted thereon two arms 170 and 190 as most clearly shown in Figure 30. The arm 190 has at its upper end an inclined cam edge 190' which is prolonged toward the back of the machine in a long dwell 190'', the outer edge of which is in the arc of a circle concentric with the shaft 160. The arm 170 also has at its upper end an inclined cam edge 170' which is prolonged into a dwell 170″ parallel to the dwell 190″. The returning spring 174 for the shaft 160 is connected by a link 184 with a pin which is pivoted between these two arc-shaped arms 170″ and 190″, the rear end of the spring being connected, as shown in Figures 25 and 26, to a stud 189 projecting from the side plate 10.

The cam 190′ is adapted to co-operate with a follower roller 169′ (Figures 25 and 27) which is mounted on the end of a lever 166 which lever is pivoted to the frame plate 10 on a stud 182. The lever 166 has a forwardly extending arm from the side of which a pin 183 projects into a slot in the free end of an arm 167 which is rigidly mounted on the rock shaft 56 of the register frame outside of the frame plate 10. The construction is such that as the handle 158 begins to move toward the front of the machine the cam 190′ immediately acts on the roller 169′ and rocks the lever 166 which in turn through the arm 167 rocks the shaft 56 in such fashion as to depress the register wheels 51 into engagement with the gears 49. This motion of the lever 166 is against the tension of a spring 165 (Figure 29), which spring is connected to a third arm of said lever and to a post 185 projecting from the frame plate 10. This spring is the returning spring which normally holds the register in its upper or inoperative position. The motion of the shaft 56 under the impulse of this spring is limited by an arm 167′ (Figures 26 and 29) of the lever 167, which arm when the parts are in normal position as shown in Figure 26, bears against the frame rod 11.

The depression of the register frame by the cam 190′ takes place immediately the handle 158 begins its motion and said register frame is held in its depressed position by the dwell 190″ until the handle has returned to normal position again. It is the function of the cam 170′ to raise the detent levers 54 out of engagement with the register wheels after the register frame is depressed. This cam co-operates with a follower roller 169 which, as will be seen in Figure 25, is normally coaxial with the roller 169′, but it will be noted that the cam 170′ does not come into operation until after the cam 190′ has depressed the register frame so that the detents are not lifted out of the register wheels until after said register wheels are in engagement with the gears 49. Figure 37 shows the parts when the register has been depressed, but the detents have not yet been lifted. The roller 169 is mounted on a lever 204 which is mounted by the side of the lever 166 on the same stud 182. The lever 204 is connected by a link 164 with a bell crank 168 which is loosely mounted on the shaft 56 between the lever 167 and the frame plate 10. As shown in dotted lines in Figure 26, the bell crank 168 has a forwardly extending arm to which is rigidly secured a bail rod 55 which passes through slots in the frame plates 10 and 10′ and which at its right-hand end is rigidly secured to another arm 168′ (Figure 1) also pivoted on the shaft 56 outside the frame plate 10′. The two arms 168 and 168′ and the rod 55 together constitute a bail or yoke frame which (Figure 37) underlies lugs 54″ of the several detents 54. The construction is such that when the roller 169 is operated by the cam 170′ the bell crank 168 is rocked by the link 164 and the rod 55 moves bodily upward lifting all of the detent pawls 54 out of engagement with the star wheels 148 as indicated in dotted lines in Figure 37, thus freeing the register wheels entirely from said detents. When the detents are raised they are held in raised position by the dwell 170″ until the operating handle has nearly returned to normal position. It will be noted, however, that on the return stroke of the operating handle the incline 170′ reaches the roller 169 before the incline 190′ reaches the roller 169′ so that the detents are allowed to drop into engagement with the register wheels before said register wheels are raised out of engagement with the gears 49.

In order to restore the slide bars 12, 13 to normal position when the handle 158 is operated, a yoke bar 15 is provided. The mechanism is best shown in Figures 1, 11, 24—27 and 29. The yoke-bar 15 lies above the slide bars 12 and back of upward projections or lugs 83′ on said slide bars. The yoke bar is mounted at its ends on arms 17 projecting upward from a rock shaft 16 which is journaled in the frame plates 10 and 10′, the arms 17 being mounted inside of said frame plates. The shaft 16 extends through the frame plate 10 and has mounted on its left-hand end the hub 177″ (Figure 1) of an arm 177 by means of which the rock shaft is operated. The arm 177 (Figure 26) has connected to a branch thereof a spring 206 the other end of which is connected to a stud 205 projecting from the frame plate 10 and the tension of this spring normally holds the yoke frame in its rear position shown in Figures 24 and 11. The motion of the parts under the impulse of this spring is limited by a bracket 187 secured to the frame plate 10 and having a pad 186 of leather, felt or other sound deadening material secured to the under side thereof, this pad being adapted to be engaged by the forwardly extending branch of the arm 177 as shown in Figure 26. The arm 177 has pivoted thereto at 176″ the rear end of a link 176 the forward end of which is pivoted at 197 to a lever 172, which lever is pivoted on the main operating shaft 160. In order to provide for adjustment the rear end of the link 176 consists of a wire 181 which is threaded and passes through an ear bent off from the link 176. The length of said link may be adjusted by means of two nuts 181' threaded on to said wire 181, said nuts being on opposite sides of said ear.

The arm or lever 172 has a hub 160' (Figure 25) which is loosely mounted on the shaft 160 between the sleeve 160'' and a collar 199 which is rigidly mounted on the shaft 160. The lever 172 normally stands in the position shown in Figure 26 and this lever is operated toward the front of the machine by a lug or stud 180 projecting from the side of the arm 170 which arm, it will be recalled, is rigidly mounted on the shaft 160. The stud 180 normally stands at such a distance from the lever 172 as to afford a certain amount of lost motion between said stud and lever, this lost motion being of such an extent as to cause the two followers 169 and 169ª to be operated by their respective cams 170 and 190 before the lever 172 begins to move and to restore the slide bars 12. When the operating handle is in its extreme forward position the parts thus referred to occupy the position shown in Figure 29 where the broken line m is drawn through the center of the shaft 160 and through the center of the pivot 176''. It will be seen that the pivot 197 at the forward end of the link 176 is here a little below the dead center so that the returning spring 206 has its tension exerted at this time to prevent rather than to cause the restoration of the lever 172 to normal position. The link 176 is curved as shown so as to permit of its passing the dead center and it is arrested in its extreme operated position shown in Figure 29 by a lug 176' formed on the under side of said link and engaging the hub 160' of the lever 172. It results from this construction that when the operating handle 158 starts to return to normal position the lever 172 and the parts controlled thereby, including the yoke-bar 15 and all of the slide bars 12, remain temporarily in their extreme forward positions. A purpose of this momentary detention of these parts in operated position is to insure that the transfer devices have time to operate in case a number of transfer operations have to take place successively as for instance when a number of the wheels stand at "9" and the carrying operation begins at the lowest one of such wheels. The construction whereby these part are thus momentarily held in operative position, therefore constitutes a sort of timing device to allow time for the carrying operation.

Another purpose of this timing resides in the fact that it is necessary to elevate the register so as to bring its wheels out of engagement with the wheels 49 before the racks 36—37 are released from the influence of the bar 15. These parts remain in this position until the operating shaft 160 reaches the position in its return stroke shown in Figure 27. The lever 172 has an arm 172ª having a lug 172' projecting therefrom which lug, when the parts reach the position shown in Figure 27, stands in the path of the return motion of the stud 180. In said Figure 27 it will be seen that the roller 169 has started down the incline 170' and will have about reached the bottom of said incline by the time the stud 180 reaches the ear 172' so that before said stud begins to operate the lever 172 the detents will have dropped into engagement with the register wheels. Said stud then begins to restore the lever 172, moving said lever past the dead center to a position where the returning spring 206 tends to restore said lever to normal position. It will be understood that the first part of this motion will communicate no motion at all to the lever 177 and yoke-bar 15 as the link 176 will be merely passing its dead center. As shown in Figure 24 the yoke-bar 15 is moved forward past the normal position of the contact surface 83' for a distance equal to one tooth space of the racks 36, 37. This is for the purpose of placing the springs 14 under tension to transfer in case there is any transfer on that particular addition. Of course, those wheels to which an increment of motion is given by transfer will not have their springs 14 tensioned in this way, but some or all of said springs may be so tensioned at each operation. The yoke-bar 15, when it is in its extreme forward position, is acting against the tension not only of its own returning spring 206 but also against the tension of the springs 46 and of such of the springs 14 as have been stretched. The fact that the link 176 is near its dead center at this time, gives the lever 172 so high a leverage on the yoke-bar 15 that this larger spring tension is not felt at the operating handle. It will be seen that if, on their return stroke, the arm 172 and link 176 were moved past their dead center without something to restrain them this yoke-bar and the parts connected therewith would be restored to normal position violently and some of the rack bars 12 might be restored so quickly that the pawls 25 would not have time to catch the first tooth 12''. In order to prevent the yoke-bar 15 from being restored thus suddenly after passing the dead center, and possibly before the register wheels are raised out of engagement with the wheels 49, I provide a latch 171 which is pivoted at 171' to the side of the cam arm 170. This latch has a notch 171'' (Figure 26) which, when the parts reach the position shown in Figure 27, is snapped down over an ear 172'' bent off from the lever arm 172ª so that this lever arm is for the moment coupled or locked to the cam arm 170. This latch or pawl 171 prevents any sudden motion of the yoke-bar 15 until the bars 12 have moved back far enough to be engaged by the pawls 25, after which said yoke-bar is acted on only by its own spring 206. In order to release the latch 171 at or near the extreme end of the returning motion of the operating shaft 160, said latch is prolonged as shown in Figure 27 and at about the end of the return motion of the operating shaft the end of the latch engages one of the shafts 32, which shaft arrests the latch and causes it to be tripped off, thus releasing the lever 172 and permitting said lever and the parts controlled thereby to be restored to normal position shown in Figure 26 by the energy of the restoring spring 206. When the parts are in the positions shown in Figure 29 the motion of the pawl 171 under the impulse of its spring 178, is limited by the stud 180. It will be perceived that most of the return motion of the shaft 16 and the parts connected therewith is effected by the spring 206 when said parts are free from any restraint so that these parts snap back somewhat suddenly to normal position. It is for this reason that the pad 186 is provided. When the yoke-bar 15 is restored to normal position the slide bars 12 are held in their normal positions by the detents 25 (Figure 24). The timing devices above described make it unnecessary in this machine to employ a governor in connection with the operating mechanism.

The transfer or carrying mechanism may be best understood by reference to Figures 20, 21 and 22, reference being also had to Figures 1 and 11. Each of the register wheels comprises at the extreme left-hand element thereof a tooth or trip 152 (Figures 21 and 23) and as here shown this tooth is part of a plate which is rigidly mounted on the hub portion 145 (Figure 5) of the register wheels. The trip 152 is adapted to operate a double acting pawl or lever 153, these double acting pawls being mounted on the shaft 50 between the double pinions 49, 49' as will be understood by reference to Figure 36. Each of the pawls or levers 153 is adapted to operate a lever 47 which is pivoted on the frame rod 48 and which extends from said frame rod horizontally toward the rear of the machine. This rear horizontal arm of the lever 47 has bent off therefrom toward the left an ear or bracket 154 which lies above the slide bar 13 of the next higher denomination and which is normally in position to act as a stop which co-operates with a stop lug 155 formed on the upper edge of said bar 13 to limit the forward motion of said bar 13. Each of the levers 47 is controlled by a returning spring 199 which normally holds said lever in the position shown in Figure 21. Each of the pawls or levers 153 has an ear or short arm 153ª which lies in the path of the trip 152 of the corresponding register wheel. This lug or lever arm 153ª is formed with two square sides as shown so that it will be moved by the trip 152 when the register wheel passes from the "9" position to the "0" position in the operation of addition and so that the trip will be moved in the opposite direction when the register wheel passes from the "0" position to the "9" position in the operation of subtraction. The trip 153 has a toe 153' and a heel 153'' both of which are normally in contact with the lever 47 as is shown in Figure 21 so that said lever 47 will have its forward arm depressed whenever the lever 153 is operated in either direction. It will be seen that the lever 47 is thus operated in the same way and at the proper time both for addition and for subtraction. Moreover, the heel 153'' and the toe 153' of this lever are so designed as to impart the same extent of motion to the lever 47 whether the operation be that of addition or of subtraction. When the forward arm of the lever 47 is thus depressed the rear arm is elevated, raising the ear 154 out of the path of the lug 155 of the next higher bar 13, thus allowing to said bar an additional increment of motion. As the lever 47 may be tripped before the lug 155 reaches the ear 154, a detent or catch 45 is provided for holding the lever 47 in its operated position as shown in Figure 22. The detents 45 are pivoted on a frame rod 44 which is supported at its end by the frame plates 10, 10', and each of said detents has a forwardly extending arm to which is connected the lower end of the spring 199 so that this spring in addition to its fuction of restoring the lever 47 to its normal position and holding it there also performs the function of pressing the catch 45 toward the rear of the machine. Said catch is formed with a notch 45' which co-operates with a lug or ear 156 bent off from the rear end of the lever 47. This ear is normally below the notch 45' as shown in Figure 21 but when the lever 47 is operated the catch 45 snaps back as shown in Figure 22 and retains the lever in its operated position. Each of the slide bars 12 has an ear 157 bent off toward the right from the extreme forward end thereof and this ear is in such position that when the bar 12 is drawn forward to its extreme position by the yoke-bar 15, said ear 157 moves the catch 45 forward, thus releasing the lever 47 and allowing it to drop back with the ear 154 resting on the top of the lug 155. The bar 13, after the operation of carrying and after the release of the handle 15, is drawn back by the spring 46 to the position shown by full lines in Figure 24 where it is arrested by the detent 25 engaging one of the teeth 12″ on the bar 12. When the operating handle is operated the yoke-bar 15 moves forward to the position indicated in broken lines in Figure 24, moving the bar 12 one tooth space further forward than its normal position. If no carrying takes place the bar 13 is held against participating in this motion by the stops 154, 155 and the spring 14 is stretched. In case any carrying does take place on the wheel affected by any particular slide bar 12, 13 the two bars 12 and 13 move forward together, thus turning the wheel 49 a distance one tooth greater than that corresponding to the number set up in that denomination. In case no number is set up in that denomination the bar 12 is, nevertheless, moved a single space toward the front of the machine and in case of transfer to the denomination concerned such transfer is effected by the spring 14 when the lug 155 is released from the stop 154.

The arm 153ª of the pawl or lever 153 is made with square corners as shown in Figures 21 and 22 and the parts are so proportioned that the trip arm 152 occupies the greater part of the motion from one tooth position to the next in turning said lever 153. This part 153ª is a lever arm and not a cam so that there is less friction in operating it than there would be in the case of the cam. Moreover, the lever arm from the center of the rod 48 to the stop 154 is much shorter than the forward lever arm of the lever 47. The trip 152 thus has a considerable leverage on the stop 154 which also adds to the ease with which said stop 154 can be lifted by the trip 152. These features are important in this class of transfer devices for the reason that it may happen that there is nothing but the tension of the spring 14 to turn the trip 152 and the tension of the next spring 14 to the left is exerted to press the lug 155 against the stop 154. In other words, where the transfer is being effected across a long row of nines the register wheels are not positively driven but are driven only by the springs 14 acting through the intermediate connections and there is possibility of some one of the carrying devices sticking and thus interrupting the transfer across the series of nines. It is therefore highly important that there be as little friction as possible in these transfer devices and that the trip 152 have some such mechanical advantage as the leverage referred to over the stop 154 in order to insure that said stop be operated.

As shown in Figure 11 there is a stop arm 47′ for the bar 13 of lowest denomination. There is no need to have this stop pivoted as there is no wheel of lower denomination to operate it.

It will be noted that the double pinions 49, 19′ constitute drivers for the several register wheels, that these drivers are operated in either direction for addition or subtraction, and that the transfer mechanism imparts, on occasion, to any one of said drivers an additional increment of motion in either direction to transfer, this additional increment of motion being in one direction in case of addition and in the opposite direction in case of subtraction. So far as I am aware this mode of transferring in either direction, is broadly new.

It will also be noted that the denominational devices or members 13 are always operated in the same direction but that the gearing between said denominational devices and the register wheels is reversible so that the said denominational devices operate the register wheels in either direction for addition or subtraction; and that the transfer mechanism imparts, on occasion, to any one of these denominational members an additional increment of motion in the same direction as that in which said member is operated, and that this additional increment of motion is transmitted to the register wheel in one direction for addition and in the other direction for subtraction. So far as I am aware this form of transfer mechanism is new.

The levers 47 and the setting devices mounted on the shaft 50, are spaced apart in denominational groups by a series of partition plates 38 shown in Figures 1, 11 and 36, these partition plates being in the same vertical planes as the partition plates 53′ of the register frame. Said partition plates 38 have the outline indicated in Figure 11 and they are supported on two frame rods 39 which connect the frame plates 10 and 10′, said partition plates being suitably spaced apart on said rods 39 either by peripheral grooves in said rods or by collars strung along said rods. The shaft 50 and the pivot rod 48 pass through these partition plates. The levers 47 are formed with elongated hubs which are pivoted on the rod 48 and which are of such length as to extend from one partition plate 38 to the next.

In order to split the register for use in adding more than one column or for any other reason, devices are provided which are shown in Figures 11, 21 and 22. A series of stop arms or catches 43 are mounted on the rod 44 and these parts normally stand in the positions shown in Figure 21 where they are inoperative. Each of the arms 43 has a shoulder or tooth 43′ which, if the arm be raised to a position a little above its normal position, will stand in front of one of the bars 13 and will prevent said bar from moving forward to transfer. Each of the arms 43 has pivoted thereto a pawl 42 which extends downward through a suitable slot in the base plate 10ª of the adding machine. The register can be split at any point by tilting the machine back and pressing one of these pawls 42 upward with the finger. Each of said pawls is formed near its lower end with a notch 42' which is adapted to snap over the plate 10ª and hold the pawl and the stop 43 in elevated position. The pawl 42 is controlled by a spring 198 connected at one end to said pawl and at the other end to the arm 43. If one of said arms 43 has been elevated in the manner described it can at any time be lowered by pressing its pawl 42 toward the rear of the machine and permitting it to drop down to the position shown in Figure 21. It may not be necessary to equip the machine with a complete set of these split-register devices, but one or several of them may be provided at any points where there is likelihood of its being desirable to split the machine.

The machine is set for addition or subtraction by swinging the set of pitmen 35 up or down at their forward ends and thus raising or lowering the racks 36 and 37 carried by the forward ends of said pitmen. To this end each of the rack bars 36 is formed with an elongated slot 36' into which pins 41' project from a series of arms 41 rigidly mounted on a shaft 40 which stands just in front of the rack bars 36 and is journaled in the frame plates 10, 10'. As shown in Figure 2 the shaft 40 projects through the frame plate 10' and has rigidly mounted thereon just outside of said frame plate a rearwardly extending arm 134 having a pin 134" projecting therefrom into a slot in the forward end of a lever 133 which is pivoted on a stud 133', the construction being such that the arm 134 can be operated up and down to rock the shaft 40 by means of the lever 133. Said lever 133 has pivoted thereto the lower end of the stem 132 of a key 132' which stands above the forward cover plate 3 of the adding machine. The rear end of the lever 133 is drawn upward by a spring 135 so as normally to hold the arm 134 and with it the arms 41 and pins 41' normally in the lower of their two positions. The motion of the arm 134 under the impulse of this spring is limited by a projection 134' on said arm 134, which projection is adapted to rest on the stud 133'. The key stem 132 is formed with a shoulder 132" which, when the key 132 is depressed, is adapted to be moved under the cover plate as shown in Figure 2 and to hold the key in its depressed position. The key may be released by pushing it slightly toward the rear of the machine and it will be elevated by the spring 135. It will be perceived that when the key 132' is in its upper position the upper racks 37 will engage the pinions 49' and the register wheels will be turned toward the rear of the machine. This is the position of the parts shown in Figure 24. When the key 132' is depressed as shown in Figure 2 the lower racks 36 engage the pinions 49' and the register wheels are turned toward the front of the machine. From the preceding description it will be understood that the machine works equally well either way. The numerals are shown in the present case so arranged on the wheels 146 that said wheels are turned toward the front of the machine to add and toward the rear of the machine to subtract. Addition is therefore performed when the key 132' is depressed as shown in Figure 2 and subtraction when the parts are in the position shown in Figure 24.

It sometimes happens that the operator in writing a number either strikes the wrong key or else strikes a key with insufficient force to print it distinctly. In such a case the typewriter carriage would be moved back to the number erroneously or indistinctly written; and if the correct number was written but indistinctly the same key would be struck again. If the wrong digit had been written it would be erased and the correct digit written in its place. Such a correcting operation might cause an erroneous setting of the adding mechanism or it might not. If in case the wrong key was struck and the number actually written was smaller than the correct number no harm would be done in the adding mechanism. When the incorrect number was written the slide bar 12 would have moved back until it was arrested by one of the slides 18. When this digit was erased and the correct digit was written this same slide bar 12 would be again released and would move on down to the correct stop slide 18 where it would be arrested in its proper position. If, however, the digit erroneously written was larger than the correct number then the stop 83 on the slide bar 12 would already have passed the proper stop slide 18. When the correct digit was written in place of the incorrect one the slide bar 12 would again be released and would move toward the back of the machine past the "9" position. If this slide bar were then restored by the operating handle after the number had been written the wrong number would be added in that denomination. The same thing would occur if the same key were struck in the same denomination twice. When one of the stops 83 is arrested by one of the slides 18 on the depression of a numeral key, then when the numeral key is released and the slide 18 returns to normal position the stop 83 steps back to a position between the operated slide 18 and the next slide of higher numerical value. If now this same key be depressed in the same denominational position this same slide bar would again be released but would already have passed the stop slide 18 so that it would move on toward the back of the machine and would result in erroneous addition. I have provided means for locking the machine in either of these two cases that would result in incorrect addition, but said locking means does not operate until the adding machine has been so set as to result in erroneous addition, that is to say, if the wrong key be struck and the correct number is a larger number than the one incorrectly written, then the locking mechanism is not thrown into operation; but if the key erroneously struck is of larger value than the correct number, or, if the same key is struck in the same denominational position twice, then the lock is operated. This locking means is shown in Figures 1, 11, 25, 26 and 29. The parts are so constructed that when the slide bar 12 is released entirely and is not arrested by any stop slide 18, it moves toward the rear of the machine a distance a little greater than it would move if the digit "9" were set up on said slide. Each of said slide bars 12 has a lug 29' which, when the slide 12 is in the position to which it is set by the "9" digit key, stands just in front of a bail-rod 29 mounted on arms 30 which are rigidly mounted on and project upward from a rock shaft 31 journaled in the frame plates 10 and 10'. The construction is such that if any of the slide bars 12 moves too far toward the rear, the bail-rod 29 is moved toward the rear of the machine, rocking the shaft 31. As best shown in Figure 25, the left-hand one of the arms 30 has a stud 30' projecting therefrom through the frame plate 10 and this stud has pivoted thereto the rear end of a link 175 (Figure 26) the forward end of which is pivoted to a bell crank latch lever 173 which in turn is pivoted on a screw 179 threaded into the frame plate 10. The weighted arm of the bell crank 173 extends toward the front of the machine and at its forward end is formed into a hook 173' which normally lies just below the path of a stud 180' (Figure 25) having one side flattened to co-operate properly with said hook 173'. The stud 180' projects toward the right from the cam arm 190 which is rigidly mounted on the main operating shaft 160. The flattened face of this stud is indicated in dotted lines in Figure 26. The studs 180 and 180' are here shown as coaxial so that in Figure 26 this dotted line appears to cross the stud 180. The construction is such that when the bail-rod 29 is moved toward the rear by some one of the bars 12, the bell crank 173 is rocked by the link 175 and the hook 173' moves in front of the stud 180' and locks the operating mechanism against operation, thus preventing the addition of the number erroneously set up in the adding machine.

For the purpose of correcting errors in the adding machine a correction lever or handle 119 is provided at the right-hand side of the machine as shown in Figures 1 and 35. This lever 119 is rigidly mounted on the outer end of a rock shaft 116 which is mounted coaxially with the shaft 16 which operates the bail rod 15. As here shown, the right-hand end of the shaft 16 has a collar 118 rigidly mounted thereon by means of a pin 115, said collar projecting beyond the end of the shaft 16 and having the left-hand end of the shaft 116 pivoted therein. The right-hand end of the collar 118 is cut away, forming a shoulder which is adapted to be engaged by a pin 117 projecting from the shaft 116 (Figure 2). The construction is such that when the shaft 16 is rocked by the operating handle 158 it does not turn the shaft 116 but if the shaft 116 be turned by the handle 119 the shaft 16 will be turned with it, thus operating the bail-rod 15. The right-hand end of the shaft 116 is journaled in the right-hand frame plate 1 of the adding machine and just inside of said frame plate said shaft has an arm 121 rigidly mounted thereon and normally resting against a stop pin 120 projecting from the frame plate 1. This handle normally stands at an inclination toward the back of the machine so that when the machine is operated by the handle 158 the handle 119 is held against operation by its own weight. When the shaft 16 is operated by the shaft 116 and handle 119, the lever 172 (Figure 26) rocks idly on the shaft 160 without turning said shaft 160. The effect of operating the handle 119 is therefore merely to restore the slide bars 12, 13 to normal position without depressing the register frame to bring the register wheels into engagement with the gears 49. When, therefore, the racks are restored by the correcting handle the register wheels are not operated. It will also be observed that when some of the racks have been moved too far toward the rear by incorrect operation of the keys, the lock 173 which prevents the operation at that time of the operating handle 158, does not prevent the operation of the handle 119. It will also be seen that when the racks are restored to normal position by the handle 119 the locking lever 173 will drop by its own weight to its normal inoperative position, thus unlocking the handle 158. The correction handle 119 may be equipped with a full stroke device if desired.

After the writing of the last number in the column the operator might forget to pull the operating handle and attempt to read the total. This would, of course, result in an erroneous total as the last number had not been added in. To prevent such an error I provide means whereby as soon as any of the racks 12 has been displaced from its normal position by the operation of the numeral keys, the register wheels are covered up by a shield which remains over said wheels until the operating handle has been operated. This device is shown in Figures 1, 2, 4, 11, 19, 23 and 33. A shield plate 130 (Figures 1, 4, 19 and 23) extends across the register above the wheels and normally stands just back of the line of numbers which indicates the total. This shield plate is mounted at its ends on vertical arms 129 which at their lower ends are rigidly mounted on a rock shaft 128 pivoted in the frame plates 10 and 10'. This rock shaft extends at its right-hand end through the frame plate 10' where it has rigidly mounted thereon an upstanding arm 127 which, as shown in Figure 2, projects upward through a slot in the cover plate where it can be moved if desired by hand. The arm 127 has pivoted thereto a long link 126 which extends toward the rear of the machine where it is pivoted to the lower end of an arm 122 mounted on a rock shaft 123 which is pivoted in the frame plates 10 and 10'. Two arms project forward from the shaft 123 inside the frame plates 10, 10' and said arms at their forward ends carry a bail-rod 125 having a series of anti-friction rollers 125' mounted thereon. There is one of these rollers for each of the bars 12 and said rollers lie against the upper edges of said bars. Each of the bars 12 at its rear end is cut away to form an inclined shoulder or cam 12' (Figure 11). The construction is such that when all of the rack bars 12 are in their normal positions the rollers 125' rest on the lower parts of said bars just at the rear of said inclines 12'; but as soon as a numeral key is depressed in the adding column and one of the bars 12 moves toward the rear of the machine, the yoke-bar 125 is cammed upward, slightly rocking the shaft 123 and with it the arm 122 whereby the link 126 is caused to move the shield 130 toward the front of the machine and to cover up the number indicated on the register wheel. This cover plate remains in this position until the operating handle has restored all of the bars 12 to their normal position when it drops back by gravity to uncover the wheels. It may happen that the operator wishes to inspect the wheels for some reason when they are covered up and for this reason the arm 127 is arranged to be operated by hand. In order that said arm may be operated without straining the mechanism the arm 122 is made in two parts, the lower part 202 being pivoted to the upper part as shown in Figure 19. The two parts of the arm are connected by a spring 203 which tends to rock the arm 202 toward the front of the machine, the motion of this arm being limited by an ear 202' bent off from the arm 202 and extending in front of the arm 122. When the arm 127 is pushed toward the rear of the machine by hand the joint between the arms 122 and 202 is broken, slightly stretching the spring 203; and when pressure on the arm 127 is released said spring restores the parts to their former positions.

In order to indicate at all times whether the adding machine is connected up for operation by the numeral keys and if so in what denomination, I have provided an indicator plate 78 (Figures 1, 3, 4 and 12 which indicator is segmental in side elevation as shown in Figure 12 and which is mounted on arms 77 projecting upward from a rock shaft 80 to which said arms are rigidly secured. The shaft 80 is journaled at one of its ends in the frame plate 10 and at the other in the left-hand frame plate 1. One of the arms 77 is connected as shown in Figure 12 by a link 76 with an arm of the toothed segment 74 which constitutes part of the denomination selector of the machine so that the shaft 80 and the parts mounted thereon rock in unison with the segment 74. The indicator plate 78 is triangular in outline as seen from the top and is formed with a series of pointed teeth 78' (Figure 1). This plate moves beneath a sight opening in the register cover plate as shown in Figure 4. This sight opening is surrounded by a guard 149 having a scale engraved thereon to indicate denominational positions. The points 78' are so disposed that when the shaft 63 is in position to cause numeral keys to set up a digit in a certain denomination one of these points will be in register with the mark on the scale 149 which indicates that denomination. In Figure 4 the indicator shows that the adding mechanism is in position to have a digit set up in the position corresponding to units or cents, that is to say, in the lowest denominational position of the machine. When the shaft 63 is not in position for setting up any digit in the adding machine, the indicator shows this fact because at such times none of the points 78' is visible.

I have also provided means for disconnecting the adding mechanism entirely from the typewriting mechanism and this disconnecting means as here shown is associated with the indicating device just above described. The adding mechanism is disconnected by pressing a key 79' (Figure 4) which is mounted on a key stem 79 (Figures 1, 3 and 12), said key stem being pivoted at its lower end on a branch of the left-hand arm 77 of said indicating device. The construction is such that the key moves up and down as the indicating device moves back and forth and the construction is also such that if the key 79' be pushed down it will rock the shaft 80 and the indicator 78 and through the link 76 the segment 74 and all the parts connected with said segment. This key is shown in its extreme depressed position in Figure 12 where it will be seen that the arms 64 are all rocked to inoperative positions so that none of the denominational selecting devices would be operated if a key were depressed. In this position of the parts the coupler 85 is moved a little further to the right than it is shown in Figure 14 so that the pin 86 acting on the cam 84' moves said hook down entirely out of the paths of the column stops M so that the carriage has no effect on the denomination selecting mechanism.

I have also connected with these parts a device for disconnecting the typewriter keys from the rock shafts 32, 32'. As shown in Figure 12 the arm 77 to which the key 79 is connected has another arm 81' from which a pin 81" projects into a slot 82' in the forward end of a link 82 which at its rear end (Figure 3) is pivoted to an arm 94 rigidly secured to and projecting upward from a rock shaft 99 which is pivoted in the frame plates 10, 10' and projects a considerable distance beyond each of said frame plates. As shown in Figures 15 and 16 the left-hand guide plate 95 which guides the push bars 96, is pivoted to this arm 94 so that when said arm is moved toward the rear of the machine as shown in Figure 16 the push bars 96 are moved to such positions that when their corresponding keys are depressed they do not strike against the arms 102 of the rock shafts 32 and do not operate said rock shafts. The guide plate 95 is supported at its rear end by the arm 94 and at its forward end it is slidably supported on a screw 103 which passes through an elongated slot in said guide plate so that said guide plate has a limited freedom of motion in a front and back direction. The guide plate 95' on the right-hand side of the machine is similarly connected with an arm 94' on the right-hand end of the shaft 99 as shown in Figure 1. Any suitable spring may be provided for normally holding the guides 95 and 95' in the positions shown in Figure 15. The slot 82' is so disposed and is of such extent that in the ordinary oscillations of the shaft 80, due to the step-by-step motion of the denomination selecting mechanism, the link 82 and the parts controlled thereby are not operated, said parts being operated only when the denomination selecting mechanism has been moved to the extreme position indicated in Figure 16. The key 79 is formed with a shoulder 79" (Figure 3) which, when said key is depressed, may be pushed under the cover plate of the machine to hold the key in its depressed position. When this key is thus locked down the typewriter may be operated without having any effect at all on the adding machine.

In order to indicate the punctuation of the number shown on the register wheels a device shown in Figures 33 and 34 is provided. This consists of a series of disks 151 each pivoted between a plate 150 and the escutcheon 150' which surrounds the sight opening for the register. These disks are situated between the register wheels and each of them projects somewhat back of the plate 150 as shown in Figure 33 and each of the disks 151 has marked thereon a comma, a period and a radial straight line, these marks being spaced a quadrant distance apart and the fourth position on each disk is left blank. The period is used to indicate the decimal point and the radial straight line to indicate the point, if any, at which the register is split. Where no punctuation point occurs the blank part of the disk is turned into view. These disks may be made with knurled edges so that they can be turned by hand to point off the numbers indicated by the register. They are shown in Figure 33 set to point off amounts in U. S. money with the decimal point and two commas. A similar set of punctuation or pointing-off disks 151" (Figure 4) is mounted above the tabulator keys P of the typewriter. It is contemplated that the two pointing-off devices be set to correspond with each other.

In order to provide for writing punctuation marks on the paper without interfering with the register, I have provided a special period key J' (Figure 4), this key being in addition to the regular period key which is in the forward bank of keys. The type bar F which is connected with the key J' is arranged to print a period a little to the left of the ordinary printing point and this type bar is so constructed that it does not operate the typewriter escapement so that the period printed by this type bar is printed between two digits, which digits however are spaced apart the same as the other digits of the number. As shown in Figure 2 it is the part F' of each type bar that strikes the universal bar or lever E and operates the typewriter escapement. The special period type bar is shown in Figure 38, where it will be seen that the shoulder F' is cut away so that this type bar strikes the platen but does not operate the escapement. It will, of course, be understood that a special comma key may also be provided if desired but I have only thought it necessary to show this one key arranged in the manner described.

In order to set the register wheels to zero when it is desired to do so without subtracting out the number indicated on said wheels, the mechanism shown in Figures 5 to 8, inclusive, is provided. Parts of this mechanism are also shown in Figures 1 and 2. In the normal operation of the machine the shaft 52 does not rotate but it is arranged to be rotated to set the register wheels to zero. To this end said shaft is prolonged toward the right through the right-hand frame plate 1 which is provided with an opening of such a character as to allow the shaft to move up and down when the register frame is raised or lowered in the operation of adding; and a hand crank 139 is mounted on the outer end of said shaft. At intervals along the shaft 52 a series of notches 52' are formed, said notches being spaced apart to correspond with the spacing of the register wheels along the shaft. Each of said register wheels is provided with a zero setting pawl 147 which as here shown is pivoted to the web of the numeral disk 146. The hub 145 of the register wheel has a slot cut in it so as to permit the point of the pawl 147 to engage the shaft 52 against which said pawl is pressed by a spring 147'. The notches 52' normally occupy the position shown by full lines in Figure 5; that is to say, they are not in position to be engaged by the pawls 147 so that said pawls do not normally interfere with the rotation of the register wheels. By moving the shaft 52 a suitable distance toward the left these notches 52' will be brought under the pawls 147 as indicated by dotted lines in Figure 5. In order so to move the shaft said shaft has mounted thereon a cam disk 143, the right-hand side of which is in the form of a cylindrical barrel having a notch 143' therein (Figure 8), said notch having one wall inclined as shown and the other wall abrupt. A pin 144 projects into this notch, said pin being secured to a bracket 141 which is rigidly mounted on the shaft 56, said shaft being prolonged toward the right for this purpose. The bracket 141 is perforated and the shaft 52 passes through said bracket so that said bracket supports the shaft near its right-hand end, a matter of some importance as this shaft is a light one. A collar or disk 137 is rigidly mounted on the shaft 52 and this disk has projecting from the left-hand side thereof a spring barrel 138 consisting of a drum or barrel having in it a bore larger in diameter than the shaft 52. A spring 140 is coiled about said shaft 52 and is compressed between the bracket 141 and the bottom of the enlarged bore of the barrel 138 so that this spring holds the shaft 52 in its right-hand position with the pin 144 in the bottom of the notch 143' as shown in Figures 5 and 8. When the crank 139 is turned toward the rear of the machine the inclined edge of the notch 143', acting on the pin 144, cams the shaft 52 toward the left, its motion in that direction being limited by the contact of the barrel 138 with the bracket 141. The shaft is then in position to have the notches 52' engaged by the pawls 147. By imparting a complete rotation to the crank 139 the register wheels are all turned to zero and the shaft is forced toward the right, the pin 144 snapping into the notch 143'. It will be understood that the disk 143 can be made stationary and the pin 144 be mounted on the shaft 52.

An interlock is provided between the zero setting mechanism and the operating mechanism of the adding machine. This interlock consists of the disk 137 and a stationary plate 136 secured by posts and screws to the side plate 1. This plate stands with its upper edge just below the level of the lowest part of the disk 137 so that when the register frame is in its depressed position it is impossible to move the shaft 52 toward the left and therefore impossible to turn the crank 139. On the other hand, when the crank 139 has begun to turn the disk 137 has moved over the plate 136, thus making it impossible to depress the register frame. Although the parts described act as an interlock in the manner described they have a more important function in the ordinary operation of the zero setting device. After the crank 139 passes the uppermost part of its rotation the pressure of the hand upon said crank is downward and tends to depress the register frame so as to bring the register wheels into mesh with the gears 49. The first part of the motion of said crank is upward and by the time this upward motion is over the disk 137 has moved over the plate 136 so that when the downward pressure on the crank begins this disk rides on the plate and prevents the pressure of the hand from accidently depressing the register frame. These parts thus constitute means for preventing the operation of the zero setting mechanism when the register frame is depressed and also means for preventing the depression of the register frame during the zero setting operation either by an operation of the operating handle at that time or as an accidental result of the zero setting operation itself.

Various changes can be made in the details of construction and arrangement without departing from my invention.

What I claim as new and desire to secure by Letters Patent, is:—

1. In an adding machine, selecting mechanism comprising a series of movable feelers, means for moving the entire series of said feelers, and means for obstructing a selected one of said feelers to modify its motion.

2. In an adding machine, the combination of a series of movable devices and means for operating a selected one of said devices, said means comprising a series of movable parts, each connected to one of said devices, means for moving the entire series of said parts except one in such a manner as not to operate said devices, and means for obstructing a selected one of said parts so to modify its motion as to operate the connected one of said devices.

3. In an adding machine, selecting mechanism comprising a series of movable parts, means for moving the entire series of said parts, and a step-by-step moving device for interposing an obstruction into the path of one after another of said parts to modify the motion of the obstructed part.

4. In an adding machine, the combination of a series of denominational devices; a group of keys common to all of said denominational devices; a series of feelers, one for each denomination and all arranged to be operated upon the depression of any keys; means for obstructing the motion of any selected one of said feelers; and means controlled by the obstructed feeler for placing a corresponding one of said denominational devices under the control of the depressed key.

5. In an adding machine, the combination of a series of spring-pressed denominational devices; a series of detents for said denominational devices; a group of keys common to said denominational devices; a series of stops for said denominational devices, one stop for each key; a series of feelers, one for each denomination; means whereby all of said feelers are operated upon the depression of any key; means for obstructing a selected one of said feelers; and means whereby the obstructed feeler operates the corresponding detent.

6. In an adding machine, the combination of a series of denominational devices; a group of numeral keys common to said denominational devices; means whereby said keys control said denominational devices in accordance with numbers; and selecting mechanism including a series of feelers, one for each denomination; means whereby said series of feelers is operated by any of said keys; a spirally arranged series of obstructions for said feelers; means for imparting a step-by-step motion to said series of obstructions; and means operated by the obstructed one of said feelers for placing the corresponding denominational device under the control of the key.

7. In an adding machine, a selecting device comprising in combination a series of levers, means for moving the pivots of all of said levers together, means for obstructing the motion of one of said levers to cause that lever to rock about its pivot, devices to be selected, and means whereby one of said devices is operated by such rocking of the obstructed lever.

8. In an adding machine, denominational selecting mechanism comprising a series of levers, means for moving the pivots of all of said levers together, step-by-step moving means for obstructing the motion of one of said levers after another upon successive operations and thus causing the obstructed lever to rock about its pivot, denominational devices, and means whereby a selected one of said denominational devices is operated by such rocking of the obstructed lever.

9. In a combined typewriting and adding machine, the combination with the carriage and printing instrumentalities of a typewriter, of numeral keys arranged to print numbers, adding mechanism for adding numbers written or printed on said typewriter, and denomination selecting mechanism, said selecting mechanism including a series of key operated feelers, means for obstructing said feelers, and connections between said obstructing means and said typewriter carriage whereby said obstructing means is moved step-by-step from one denominational position to another.

10. In a combined typewriting and adding machine, the combination with the carriage and printing instrumentalities of a typewriter, of numeral keys arranged to print numbers, adding mechanism for adding numbers printed by said keys on said typewriter, and denomination selecting mechanism, said selecting mechanism including a series of key operated feelers, means for obstructing said feelers, and connections between said obstructing means and said typewriter carriage whereby said obstructing means is moved step-by-step from one denominational position to another, said obstructing means moving from one denominational position to another independently of and free from the other denominational devices of the adding mechanism.

11. In a combined typewriting and adding machine, the combination of the step-by-step moving carriage and printing instrumentalities of a typewriter, of numeral keys arranged to print numbers on the typewriter, adding mechanism, a shaft having a spirally arranged series of pins projecting therefrom, means for turning said shaft step-by-step in unison with the motion of the typewriter carriage, a series of key operated feelers one for each pin, said pins in their step-by-step motion coming one after another into the path of the corresponding feelers so as to modify the motion of a selected feeler when a key is operated, and denominational devices controlled by the obstructed feelers.

12. In a combined typewriting and adding machine, the combination with the step-by-step moving carriage and the printing instrumentalities of a typewriter, of numeral keys arranged to print numbers on said typewriter, a series of feelers arranged to be operated together by said keys, and obstructing means connected to move in unison with the step-by-step motion of the typewriter carriage, and normally free of said feelers but moving step-by-step into position to obstruct one after another of said feelers, and denominational devices controlled by the obstructed feelers.

13. In a combined typewriting and adding machine, the combination with a carriage, printing instrumentalities and keys adapted to print any words or numbers, of adding mechanism for adding numbers printed by said printing instrumentalities, said adding mechanism comprising a series of spring-actuated racks, one for each denomination; a series of key actuated stops common to said series of racks, one stop for each digit; means controlled by said carriage for releasing said racks one at a time as the keys are operated to write a number; and a register operated by said racks.

14. In a combined typewriting and adding machine, the combination with a carriage, printing instrumentalities and keys adapted to write any words or numbers, of adding mechanism for adding numbers written by said printing instrumentalities, said adding mechanism comprising a series of spring-actuated racks, one for each denomination; a series of key actuated stops common to said series of racks, one stop for each digit; means controlled by said carriage for releasing said racks one at a time as the keys are operated to write a number; operating mechanism arranged to restore said racks; and a register operated by said racks on their return strokes.

15. In an adding machine, the combination with registering mechanism, of a series of spring-actuated denominational setting-up devices, each having a series of teeth, a series of pawls, one for each of said setting-up devices and co-operating with said teeth, a series of stop slides arranged across the series of setting-up devices, a set of keys for operating said slides, denomination selecting mechanism controlled by said keys and arranged to operate any selected one of said pawls, and a stop projection on each of said setting-up devices for co-operation with said slides, said stop slides and said pawls being so related that when one of said denominational members has been operated to set up a digit it will be arrested by its pawl in such a position that said stop lug will stand between the slide by which it was arrested and the next succeeding slide of higher value.

16. In an adding machine, the combination of a series of register wheels, a single group of numeral keys common to all of said wheels, a series of rack bars for operating said register wheels, a series of stop slides arranged across said series of sliding rack bars and each having a series of stop projections, one for each of said rack bars, means connecting each of said keys with one of said sliding stop bars, springs for operating said rack bars, retaining pawls for holding said rack bars against the tension of said springs, and step-by-step moving means for connecting any of said pawls with said keys so that the appropriate pawl will be operated upon the depression of any key.

17. In a combined typewriting and adding machine, the combination with keys including numeral keys and other keys, printing instrumentalities controlled by said keys for writing any words and numbers, and the carriage of a typewriting machine, of a series of register wheels, a series of slides 12, one for each register wheel, a series of transverse stop slides 18, one for each numeral key, said stop slides being disposed across the series of slides 12, means whereby any numeral key moves the corresponding slide 18 lengthwise, stops on said slides 18 arranged to arrest any of said slides 12, springs for operating said slides 12, and denomination selecting mechanism controlled by the typewriter carriage for releasing that one of said slides 12 which corresponds to the denominational position of the typewriter carriage.

18. In a combined typewriting and adding machine, the combination of a typewriter carriage, a series of denominational devices, a group of numeral keys common to said denominational devices, means operated by said keys for printing numerals on the paper carried by said typewriter, means for imparting a step-by-step motion to said typewriter carriage, denomination selecting mechanism for the adding mechanism controlled by the typewriter carriage, a yielding connection between said typewriter carriage and a part of said selecting mechanism adapted to permit said part of the selecting mechanism to remain in one denominational position after the typewriter carriage begins a stepping motion to a new denominational position, means for detaining said part of the selecting mechanism in the first mentioned denominational position, and means whereby said numeral keys control said denominational devices.

19. In a combined typewriting and adding machine, the combination of numeral keys arranged to control the adding mechanism and to print on the paper carried by the typewriter, a carriage for said paper, denomination selecting mechanism for said adding mechanism, a yielding connection between said typewriter carriage and a part of said selecting mechanism whereby said typewriter carriage controls said part of said selecting mechanism and adapted to permit said selecting mechanism to remain in one denominational position after said typewriter carriage begins a stepping motion to a new denominational position, and means for detaining said part of the selecting mechanism in the first mentioned denominational position.

20. In a combined typewriting and adding machine, the combination of a carriage for a typewriter, a step-by-step moving denomination selecting device for the adding machine, means whereby said denomination selecting device is controlled by said carriage, means for imparting a step-by-step motion to said typewriter carriage and denomination selecting device, and means for arresting the step-by-step motion of said denomination selecting mechanism momentarily without preventing the stepping of the typewriter carriage.

21. In a combined typewriting and adding machine, the combination of printing instrumentalities and a step-by-step moving carriage of the typewriting machine, denomination determining mechanism for the adding machine, and step-by-step moving connections between said mechanism and said carriage including a yielding connection whereby the typewriter carriage can step in advance of the beginning of the stepping motion of the denomination determining mechanism.

22. In a combined typewriting and adding machine, the combination of the printing instrumentalities and the step-by-step moving carriage of a typewriting machine, digit determining means in the adding machine, numeral keys controlling said digit determining mechanism and printing instrumentalities, step-by-step moving denomination determining means in the adding machine, means in the adding machine controlled by said keys for holding said denomination determining means from leaving the denominational position in which a key was last operated, and a yielding connection between said typewriter carriage and said denomination determining means whereby the stepping of the carriage can take place in advance of that of said denomination determining means.

23. In a combined typewriting and adding machine, the combination of typewriting mechanism including a step-by-step moving carriage and printing instrumentalities and adding mechanism for adding numbers written on said typewriting mechanism, said combination including numeral keys for controlling the adding mechanism and the writing of numbers, denominational devices controlled by said keys, denomination selecting mechanism having a part that moves step-by-step in unison with the typewriter carriage, means for delaying the stepping motion of said denomination selecting part until the operation of the operated denominational device is completed, and yielding connections between said step-by-step moving part and said carriage to permit said carriage to begin its stepping motion in advance of the step-by-step moving part.

24. In a combined typewriting and adding machine, the combination with typewriting mechanism comprising a carriage, printing instrumentalities, keys, and a tabulator having one or more adjustable column stops arranged to move with the typewriter carriage, and co-operating stops; of adding mechanism for adding numbers written on the typewriter, said adding mechanism comprising denomination selecting devices controlled by said typewriter carriage, and connections between said denomination selecting devices and said carriage including a part that is normally stationary but which when the carriage reaches an adding column is drawn across the machine under the control of said column stop.

25. In a combined typewriting and adding machine, the combination of the carriage, the printing instrumentalities and the tabulator of a typewriter, said tabulator including one or more adjustable column stops and co-operating stops, adding mechanism for adding numbers written on the typewriter, and a denomination selecting device for said adding mechanism operated by the column stop or stops of the typewriter tabulator.

26. In a combined typewriting and adding machine, the combination of the carriage, printing instrumentalities and the tabulator of a typewriter, said tabulator comprising one or more adjustable column stops that move with the carriage, a coupling device normally idle but standing in the path of said column stop or stops and adapted when the carriage reaches the adding column to be drawn along by the column stop, means for moving said coupling device out of the path of the column stop at the end of the adding column and for restoring said coupling device to normal position, and adding mechanism having denomination selecting devices controlled by said coupling device.

27. In a combined typewriting and adding machine, the combination of the carriage, printing instrumentalities and tabulator of a typewriter, said tabulator including a plurality of adjustable column stops; adding mechanism for adding numbers written on said typewriter, said adding mechanism including a part that moves step-by-step in unison with the motion of said typewriter carriage; and means for connecting said step-by-step moving part with one of said column stops when said carriage reaches an adding zone, for releasing said step-by-step moving part and restoring it to normal position when the carriage passes out of the adding zone and for connecting said part with another column stop when the carriage reaches another adding zone; whereby numbers written on one line of writing can be added together.

28. In a machine of the character described, the combination of a typewriting machine having a tabulator comprising one or more adjustable column stops and one or more co-operating key controlled stops, adding mechanism including denominational devices and denomination selecting mechanism, said denomination selecting mechanism including a part 85 arranged in the path of a column stop of the typewriter and means connecting said part 85 with the remainder of the denomination selecting mechanism, and means for disconnecting said part 85 from said column stop at the end of the adding column so as to permit the typewriter carriage to move past the adding column for writing beyond the adding column.

29. In a combined typewriting and adding machine, the combination of typewriting mechanism for printing any words and numbers, said mechanism including numeral keys, adding mechanism including a step-by-step moving denomination determining device, a denomination indicator at the front of the adding mechanism, said indicator comprising an oscillatory part arranged to move under a sight opening, and a link connecting said oscillatory part with said denomination determining device.

30. In a combined typewriting and adding machine, the combination of a typewriter keyboard having letter keys and numeral keys, said numeral keys being arranged in two groups at two sides of said keyboard, two universal bars, one for each of said groups of numeral keys, means for causing said universal bars to move together, and adding mechanism controlled in part by said universal bars.

31. In a combined typewriting and adding machine, the combination of a typewriter keyboard having letter keys and numeral keys, said numeral keys being arranged in two groups, adding mechanism controlled by said numeral keys, two locking bars, one for each of said groups of numeral keys, and means whereby any of said numeral keys when depressed, operates both locking bars to lock the remaining numeral keys.

32. In a combined typewriting and adding machine, the combination of a typewriter keyboard having letter keys and numeral keys, said numeral keys being arranged in two groups at two sides of said keyboard, two endwise movable universal bars, one for each of said groups of numeral keys, means for causing said universal bars to move together, and adding mechanism controlled in part by said universal bars.

33. In an adding machine, the combination of keys, spring operated denominational members controlled by said keys, and means for preventing the depression of a second key until the spring operated member controlled by a preceding key-depression has been fully operated by its spring.

34. In an adding machine, the combination of keys, key operated parts, denominational members operated under control of the keys by power other than that applied to the keys, and means for momentarily delaying the return of said key operated parts to normal position.

35. In an adding machine, the combination of keys, key operated parts, denominational members operated under control of the keys by power other than that applied to the keys, means for momentarily delaying the return of said key operated parts to normal position, and means for preventing the depression of another key until said key operated parts return to normal position.

36. In an adding machine, the combination of keys, adding mechanism including stops controlled by said keys, and means for momentarily delaying the return of said stops to normal position after the release of said keys.

37. In an adding machine, the combination of keys, spring operated racks controlled by said keys, register wheels operated by said racks, detents for said racks released by said keys, and means for momentarily delaying the return of said detents to operative position.

38. In an adding machine, the combination with a series of keys, a to-and-fro moving universal member operated by any of said keys and adding mechanism controlled by said keys and said member, of means for delaying the return motion of said to-and-fro moving member comprising a weighted part and a pawl for momentarily connecting said to-and-fro moving member with said weighted part when a key is operated.

39. In an adding machine, the combination with a series of keys, a to-and-fro moving universal member operated by any of said keys and adding mechanism controlled by said keys and said member, of means for delaying the return motion of said to-and-fro moving member comprising a heavy disk or wheel and means for momentarily connecting said to-and-fro moving member with said disk or wheel when a key is operated.

40. In an adding machine, the combination with a series of keys, a to-and-fro moving universal member operated by any of said keys and adding mechanism controlled by said keys and said member, of means for delaying the return motion of said to-and-fro moving member comprising a retarding device and means for momentarily connecting said to-and-fro moving member with said retarding device when a key is operated and for releasing said to-and-fro moving member from said retarding device.

41. In a combined typewriting and adding machine, the combination with the printing keys and printing instrumentalities of a typewriter, of adding mechanism having parts operated by the numeral keys of the typewriter, and means for momentarily delaying the return of said key-operated adding machine parts to normal position, said printing instrumentalities being free of said delaying means.

42. In a machine of the character described, the combination of a typewriting machine having a carriage and printing keys including numeral keys, adding mechanism, mechanical connections between said numeral keys and said adding mechanism, mechanical connections between said carriage and said adding mechanism, a key, and means operated by said key for throwing both sets of connections out of operation.

43. In a combined typewriting and adding machine, the combination of keys including numeral keys, printing instrumentalities controlled by said keys for printing any words and numbers, adding mechanism mounted beneath the typewriter mechanism and controlled by said numeral keys, connections between said numeral keys and said adding mechanism including push links depending from the key operated parts of the typewriter and adapted to operate parts of the adding mechanism, a guide for said push links, and hand operated means for moving said guide to bring said push links to operative or inoperative position at will.

44. In a combined typewriting and adding machine, the combination of typewriting mechanism including numeral keys and other keys, printing instrumentalities controlled by said keys for writing any words and numbers, said numeral keys being arranged in one or more rows extending from front to back of the machine, adding mechanism mounted beneath the typewriting mechanism, connections between said adding mechanism and said numeral keys including push links depending from key operated parts and adapted to operate parts of the adding machine, one or more fore and aft extending guides for said push links, and hand operated means for moving said guide or guides to bring said push links to operative or to inoperative position.

45. In an adding machine, the combination of a plurality of rows of numeral keys, said rows extending fore and aft of the machine, links depending from and operated by said keys and adapted to operate parts of the adding mechanism, a plurality of guides for said links, one for each of said rows of keys, and means for moving said guides in unison to bring all of said links to operative or to inoperative position.

46. In a combined typewriting and adding machine the combination of typewriting mechanism including numeral keys and other keys, printing instrumentalities controlled by said keys for writing any words and numbers, and a carriage; adding mechanism including denomination determining devices, means for coupling said denomination determining devices to said typewriter carriage when the latter reaches the adding column, connections between said numeral keys and said adding mechanism, a disconnect key, and means operated by said disconnect key for rendering said coupling means and said key connections inoperative.

47. In a combined typewriting and adding machine, the combination of typewriting mechanism including numeral keys and other keys for writing any words and numbers, and a carriage; adding mechanism including denomination determining devices having a part standing normally in the path of a tappet on said carriage, a disconnect key, and means operated by said disconnect key for moving said denomination determining part out of the path of said tappet.

48. In a combined typewriting and adding machine, the combination of typewriting mechanism including numeral keys and other keys, printing instrumentalities controlled by said keys for printing any words and numbers, and a carriage, adding mechanism including denomination selecting devices, means whereby said denomination selecting devices are coupled to the typewriter carriage when the latter reaches the adding column, means for uncoupling said devices from said carriage when the adding column is passed, means for restoring said devices to normal position when released from said carriage, a disconnect key, and means operated by said disconnect key for moving said denomination selecting devices to their extreme uncoupled position to render said devices inoperative by said carriage.

49. In a combined typewriting and adding machine, the combination of a stationary framework, keys including numeral keys mounted in said stationary framework, printing instrumentalities mounted in said stationary framework and controlled by said keys for writing any words and numbers, a traveling paper carriage, adding mechanism mounted in a stationary framework and including denomination determining devices, means for coupling said denomination determining devices to said paper carriage when the latter reaches the adding column, connections between said typewriter keys and said adding mechanism, and means for disconnecting said connections when said denomination determining devices reach an extreme of their motion.

50. In an adding machine, the combination of a series of registering devices and a punctuation indicator comprising a series of rotatable disks, said disks having blank spaces and punctuation points and being rotatable to bring either a blank space or a punctuation point into view.

51. The combination of a series of denominational devices and a punctuation indicator comprising a series of rotatable disks each having a blank space and punctuation points, said disks being located between said denominational devices and each being rotatable to bring either a blank space or a punctuation point into view.

52. In a combined typewriting and adding machine, the combination of typewriting mechanism comprising keys, printing instrumentalities, a carriage, and a denominational tabulator, adding mechanism comprising a series of registering devices, a punctuation indicator for said registering devices comprising a series of rotatable disks situated between said registering devices and each carrying a blank space and punctuation points and rotatable to bring either a blank space or a punctuation point into view, and similar punctuation indicators for the keys of said denominational tabulator.

53. In an adding machine, the combination of a series of registering devices, a casing having a sight opening through which to read said registering devices, and a punctuation indicator comprising two strips having rotatably mounted between them a series of disks each having a blank space and punctuation points and rotatable to bring either the blank space or the punctuation point into view, said disks being located adjacent the sight openings and between said registering devices.

54. In a combined typewriting and adding machine, the combination of typewriting mechanism including numeral keys and other keys for writing any words and numbers, and a carriage; adding mechanism for adding numbers written by said numeral keys, said adding mechanism including denomination determining mechanism controlled by said typewriter carriage, means controlled by the printing keys of the typewriter for imparting a step-by-step motion to said typewriter carriage, and a special typewriter key for writing a punctuation point, said special key not being adapted to operate said means for moving the carriage.

55. In a combined typewriting and adding machine, the combination of numeral keys and other keys, printing instrumentalities controlled by said keys for writing any words and numbers, a step-by-step moving carriage, and an escapement for said carriage, a universal bar for operating said escapement, and means whereby said keys operate said universal bar; adding mechanism controlled by said typewriter carriage and numeral keys, and a special key in the typewriter for writing a punctuation point, said special key being not adapted to operate said universal bar.

56. In an adding machine, the combination of a series of register wheels, a series of to-and-fro moving racks for operating said register wheels, keys and connections for controlling the setting of said racks, and means for preventing operation of said register wheels in case of overthrow of one of said racks.

57. In an adding machine, the combination of a series of register wheels, a series of racks for operating said register wheels, keys for controlling said racks, and means for preventing operation of said register wheels, said means being operated by the operation in the same denomination of a key of lower value after the operation of a key of higher value.

58. In a combined typewriting and adding machine, the combination of printing instrumentalities and keys for operating the same, adding mechanism controlled by the numeral keys of the typewriter, and means for locking an essential working part of the adding machine in case a correction is made in the writing which would cause an error in the adding.

59. In an adding machine, the combination of a series of register wheels, a series of racks for operating said register wheels, a series of keys, and means controlled thereby for moving said racks to set positions in accordance with numbers to be added, operating mechanism for restoring said racks to normal position and operating the register wheels, and a lock for said operating mechanism operated by any of said racks in case said rack is moved too far in the setting-up operation.

60. In an adding machine, the combination of a denominational device, numeral keys, escapement mechanism operated by said keys for controlling the operation of said denominational device, and means operated by said denominational device in case the latter escapes past the control of said escapement for locking an essential working part of the machine.

61. In an adding machine, the combination of a series of register wheels, a series of to-and-fro moving racks for operating said register wheels, keys and connections for controlling the setting of said racks, means for restoring said racks and operating the register wheels, means for locking said restoring means in case of overthrow of one of said racks, and a correction device not locked by said locking means and operative to restore said racks without operating said register wheels.

62. In an adding machine, the combination of a register, a series of denominational devices for operating said register, means for operating said denominational devices to set up thereon a number to be added on said register, a bar extending across said series of denominational devices in position to be actuated thereby in case of over-operation of one of said devices, and means operated by said bar for preventing operation of said register.

63. In an adding machine, the combination of a series of register wheels, racks for operating said register wheels, means for setting said racks in accordance with numbers to be added, an operating handle, means operated by said handle for restoring said racks while they are maintained in gear with said register wheels, a correction handle, and means operated by said correction handle for restoring said racks while they are maintained out of gear with said register wheels.

64. In an adding machine, the combination of a series of register wheels, racks for operating said register wheels, means for setting said racks in accordance with numbers to be added, an operating handle, means operated by said handle for restoring said racks while they are maintained in gear with said register wheels, means for locking said handle in case of an oversetting of any of said racks, a correction handle, and means operated by said correction handle for restoring said racks while they are maintained out of gear with said register wheels.

65. In an adding machine, the combination of a series of register wheels, racks for operating said register wheels, a single group of keys, and connections for setting said racks in accordance with numbers to be added, means for bringing said racks successively under the control of said keys, an operating handle, means operated by said handle for restoring said racks while they are maintained in gear with said register wheels, a correction handle, and means operated by said correction handle for restoring said racks while they are maintained out of gear with said register wheels.

66. In a combined typewriting and adding machine, the combination of a series of keys including numeral keys and other keys, printing instrumentalities controlled by said keys for writing any words or numbers, a carriage for the typewriting machine, a series of register wheels, a series of racks for operating said register wheels, means controlled by said carriage for bringing said register wheels successively under the control of said numeral keys, means controlled by said numeral keys for setting said racks in accordance with numbers to be added, an operating handle for restoring said racks while they are maintained in gear with said register wheels, a correction handle, and means operated by said correction handle for restoring said racks while they are maintained out of gear with said register wheels.

67. In an adding machine, the combination of a series of register wheels, racks for operating said register wheels, said racks being normally out of gear with said register wheels, means for setting said racks in accordance with numbers to be added, an operating handle, means operated by said handle for bringing said racks and register wheels into gear, means operated by said handle for restoring said racks while they are maintained in gear with said register wheels, a correction handle, and a connection between said correction handle and said rack restoring means, said correction handle being inoperative to bring the register wheels and racks into gear.

68. In an adding machine, the combination of a series of register wheels, racks for operating said register wheels, means for setting said racks in accordance with numbers to be added, an operating handle, a device having a loose connection with said operating handle for operating said rack while they are maintained in gear with the register wheels, said connection allowing said device to be operated without operating said operating handle, a correction handle having a loose connection with said rack operating device such that said device can be operated by said correction handle but said correction handle will not be operated when said device is operated by the operating handle, and means for maintaining said register wheels and racks out of gear when said correction handle is operated.

69. In an adding machine, the combination of a register, keys, setting-up devices controlled by said keys, means for operating said register in accordance with the numbers set up on said setting-up devices, means for obstructing the reading of the total after a key has been operated to set up a digit, and means operated by said operating means for removing said obstructing means.

70. In an adding machine, the combination of a register, a series of keys, devices controlled by said keys for setting up a number to be added on said register, operating mechanism for operating said register in accordance with the number set up on said setting-up devices, a shield for said register, means controlled by said keys for moving said shield to obstruct the view of said register, and means operated by said operating mechanism for removing said shield from its obstructing position.

71. In an adding machine, the combination of a register, means for setting up a number to be added on said register, operating mechanism for operating said register in accordance with the number set up, and a shield for said register controlled by said setting-up means and said operating mechanism.

72. In an adding machine, the combination of a register, means for setting up a number to be added on said register, operating mechanism for restoring said setting-up means and operating the register in accordance with the number set up on said setting-up means, and means for obstructing the reading of the register whenever any of said setting-up means is out of normal position.

73. In an adding machine, the combination of a register, a series of keys, a series of denominational members, means controlled by said keys for setting said denominational members digit value distances, operating mechanism for restoring said denominational members and operating said register, a shield for said register, and means for moving said shield to obstruct the view of the register whenever one of said denominational devices is displaced from normal position.

74. In an adding machine, the combination of a register, keys, setting-up devices controlled by said keys, means for operating said register in accordance with the numbers set up on said setting-up devices, means for obstructing the reading of the total after a key has been operated to set up a digit, means operated by said operating means for removing said obstructing means, and a handle for removing said obstructing means.

75. In an adding machine, the combination of a register, a series of keys, devices controlled by said keys for setting up a number to be added on said register, operating mechanism for operating said register in accordance with the number set up, a shield for said register, means controlled by said keys and including a yielding connection for moving said shield to obstruct the view of said register, means operated by said operating mechanism for removing said shield from its obstructing position, and a handle for removing said shield, said yielding connection permitting the operation of said handle.

76. In an adding machine, the combination of a register, means for setting up a number to be added on said register, operating mechanism for restoring said setting-up means and operating the register in accordance with the number set up, means including a yielding connection for obstructing the reading of the register whenever any of said setting-up means is out of normal position, and a handle for removing said obstructing means, said yielding connection permitting the operation of said handle.

77. In an adding machine, the combination of a series of register wheels, drivers for said register wheels, a movable frame in which said register wheels are mounted, means for moving said frame to bring said register wheels into and out of gear with said drivers, detents for said register wheels, means for moving said detents with said register wheels when the latter are moved into gear with their drivers and means for lifting said detents out of engagement after said register wheels have been moved into gear with said drivers.

78. In an adding machine, the combination of a series of register wheels, detents for said register wheels, drivers for said register wheels, a movable frame in which said register wheels are mounted, and an operating mechanism comprising cams arranged to move said frame to bring said register wheels into gear with said drivers and to raise said detents out of mesh with said register wheels, the parts being arranged to move the register wheels into gear before the detents are moved out of engagement.

79. In an adding machine, the combination of a series of register wheels, a movably mounted frame in which said register wheels are mounted, a series of spring pressed detents for said register wheels mounted in and movable with said frame, drivers for said register wheels, means for moving said frame to bring said register wheels and drivers into and out of gear, a bar extending across said series of detents, and means for operating said bar to move said detents out of engagement with said register wheels.

80. In an adding machine, the combination of a movably mounted register frame having register wheels mounted therein, detents for said wheels mounted in and movable with said frame, drivers for said register wheels, means for moving said frame to bring said register wheels into and out of gear with said drivers, and means for moving said detents out of engagement after said register wheels are moved into gear with the drivers and for moving said detents into engagement before said register wheels are moved out of gear.

81. In an adding machine, the combination of a register, setting-up devices including racks, keys for controlling said setting-up devices; and an operating mechanism including means for throwing said register and said racks into gear, means for operating said racks to operate the register after said racks are in gear with the register, and means for disconnecting the register and the racks near the end of an operation of said operating mechanism and before said rack operating means is allowed to return to normal position.

82. In an adding machine, the combination of a register, keys, setting-up devices controlled by said keys and including a series of racks, means for allowing to any one of said racks an additional increment of motion to transfer, an operating mechanism including means for bringing said register and said racks into gear, means operating after the last recited means to operate said racks and register, means for holding said rack operating means in its extreme operated position until the register and the racks have been disconnected, and means for restoring said rack operating means to normal position after the register and rack have been disconnected.

83. In an adding machine, the combination of keys, a register, setting-up devices controlled by said keys and including a series of racks, and operating mechanism including means for bringing said register and racks into gear, a device for operating said racks and the register, a link for operating said device, means for moving the said link to or past its dead center in order to retain said rack operating device in its extreme operated position until after the register and the racks have been disconnected, and means for restoring said link and rack operating device to normal position.

84. In an adding machine, the combination of a register, setting-up devices including a series of racks, means for imparting to any of said racks upon occasion an additional increment of motion to transfer, an operating handle having a positive and a return stroke, means operated by the positive stroke of said operating handle to first bring said register and said racks into gear and then to operate said register and racks, means for retaining or holding said racks in extreme operated position, and means operated near the end of the return stroke of said operating handle for releasing said rack holding means.

85. In an adding machine, the combination of a register, means for operating said register in accordance with numbers to be added, spring operated transfer devices, means included in said operating means for permitting the springs of the transfer devices under tension and means for momentarily holding said spring tensioning means in operated position and for then releasing said tensioning means.

86. In an adding machine, the combination of a register, a series of operating racks for said register, an operating handle having a positive and a return stroke, a rock shaft operated by said operating handle, a cam on said rock shaft, means operated by said cam in the first part of the positive stroke of said handle for bringing said register and said racks into gear, and for holding them in gear until the last part of the return stroke of the handle, means operated on the positive stroke of said handle after the register and racks are in gear for operating said racks and register, and means for delaying the return of said rack operating means until after the register and racks have been disconnected.

87. In an adding machine, the combination of a register, setting-up devices including a series of racks, and means including a series of springs for imparting to any one of said racks an additional increment of motion to transfer, operating mechanism including a handle having a positive and a return stroke, means operated by said handle for bringing said register and racks into and out of gear, means for operating said racks and register and for putting said transfer springs under tension during the positive stroke of the handle, means for retaining said rack operating means temporarily in its extreme operated position, means operating near the end of the return stroke of the operating handle for releasing said retaining means, and means for coupling said rack operating means to the operating handle during the last part of the return stroke of said handle and for then releasing said rack operating means from said handle.

88. In an adding machine, the combination of a register including register wheels, drivers for said register wheels normally out of gear with said register wheels, means for actuating said drivers to set up a number to be added, and operating mechanism comprising means for first bringing said register wheels and drivers into gear and holding them in gear, for then operating said drivers in accordance with the number set up, for then moving said register wheels and drivers out of gear, and for then restoring said drivers to normal position, all in one operation of said operating mechanism.

89. In an adding machine, the combination of a register, racks for operating said register, said racks and register being normally out of gear, means for setting said racks in accordance with numbers to be added, and operating mechanism including a cam having a positive and a return stroke, said cam operating to bring the register and racks into gear in the first part of the positive stroke of said cam and said cam having a dwell arranged to hold said register and racks in gear until the last part of the return stroke of said cam.

90. In an adding machine, the combination of a series of register wheels, each having a transfer trip, means for operating said register wheels in either direction for addition or subtraction, and transfer devices for transferring in either direction, said transfer devices including a double acting dog arranged to be operated in either direction by said trip.

91. In an adding machine, the combination of a series of register wheels each having a transfer trip, means for operating said register wheels in either direction for addition or subtraction, and transfer devices for transferring in either direction, said transferring devices including a double acting dog arranged to be operated by said trip in either direction from a normal middle position, and a part 47 arranged to be operated in the same direction by said double acting dog whether the latter be operated in the one direction or in the other.

92. In an adding machine, the combination of a series of register wheels each having a transfer trip, means for operating said register wheels in either direction for addition or subtraction, and transfer devices for transferring in either direction, said transfer devices including a series of driving springs 14, parts 13 operated by said driving springs, detents 47 for said spring operated driving parts and double acting pawls or levers 153 arranged to be operated in either direction by said trips and arranged when operated in either direction to release said detents.

93. In an adding machine, the combination of a series of register wheels, a series of reciprocating racks for operating said register wheels, means whereby said register wheels can be geared to their respective racks, means for operating said racks digit-value distances in one direction while said racks are in gear with said wheels, means for reversing the gearing whereby said members when moved in the same direction can turn said register wheels in either direction for addition or subtraction, and transfer devices arranged to impart to any of said denominational members on occasion an additional increment of motion to transfer, whether the gearing be arranged for addition or subtraction.

94. In an adding machine, the combination of denominational members arranged to be operated digit-value distances in one direction, a double rack connected with each of said denominational devices, a pinion arranged between the two branches of each of said double racks, means for engaging one or another of the branches of each of said racks with its respective pinion whereby the pinions can be driven by the racks in either direction for addition or subtraction, means for imparting an additional increment of motion on occasion to any of said denominational devices in the same direction whereby the corresponding pinion will be turned an additional increment in either direction.

95. In an adding machine, the combination of a series of register wheels, a series of compound denominational members 12, 13 arranged to move together but with sufficient freedom of relative motion to effect a transfer, means for setting said denominational members in accordance with numbers to be added, means for gearing said denominational members to said register wheels, means for restoring said denominational members one unit's distance past normal position, detents for arresting one of the parts of each of said compound denominational members at normal position, means for tripping said detents to transfer, and latches for holding said detents in tripping position, said latches being in position to be themselves released by the other elements of said compound denominational members.

96. In an adding machine, the combination of a series of register wheels, a series of compound slide bars 12, 13, means for affording a limited freedom of motion between the two elements of each of said slide bars, a spring for holding said elements in normal relation, a bar pivoted to one of said elements and having a double rack mounted thereon, a pinion adapted to be engaged by either of said racks whereby the pinion can be turned in either direction, register wheels operated by said pinion, a detent and trip mechanism for controlling the relative motion between said denominational member elements for the purpose of transfer, and means for operating said denominational members.

97. In an adding machine, the combination of a reciprocatory denominational slide bar, a bar pivoted to each of said denominational slide bars, two racks mounted on the free end of each of said bars, a pinion between said racks, a guide frame arranged to move said rack bars to bring one or another of said racks into mesh with said pinions for addition or subtraction, and numeral disks connected with said pinions.

98. In an adding machine, the combination of a series of pinions, one for each denomination; a series of double racks, each rack having two sets of teeth, one of said sets of teeth being adapted to engage the corresponding pinion on one side thereof and the other set of teeth being adapted to engage the pinion on the other side thereof; means for moving said racks so as to bring either set of teeth into engagement with said pinions; means for operating said racks in accordance with numbers to be added; and a register including register wheels and means for moving said register wheels into and out of gear with said pinions, whereby said racks are adapted when moved in one direction to turn said register wheels in either direction for addition or subtraction according as one or the other of said sets of rack teeth is in engagement with said pinions.

99. In an adding machine, the combination of a series of register wheels, racks for operating said wheels in accordance with numbers, means for operating said racks, means for imparting to any one of said racks an additional increment of motion for the purpose of transfer, means for causing said racks when operated in one direction to turn said register wheels in one direction for addition and in an opposite direction for subtraction, and a double acting trip for each of said register wheels arranged to be operated by said register wheel when turning in either direction, and means controlled by said trip for controlling such additional increment of motion of the rack of next higher denomination.

100. In an adding machine, the combination of a series of register wheels, a series of drivers for said register wheels, means for moving said drivers digit-value distances in either direction for addition or subtraction, and means for imparting to any one of said drivers on occasion an additional increment of motion in either direction for carrying from one denominaton to the other.

101. In an adding machine, the combination of a series of register wheels, a series of drivers for said register wheels, means for moving said drivers digit-value distances in either direction for addition or subtraction, means for imparting to any one of said drivers on occasion an additional increment of motion in either direction for carrying from one denomination to the other, and means for bringing said register wheels and drivers into and out of gear.

102. In an adding machine, the combination of a series of driving pinions, a series of double racks for said driving pinions capable of engaging said pinions on either of two sides whereby, when said racks are operated, the pinions can be turned either way, register wheels operated by said pinions, means for operating said racks digit-value distances, and means for imparting to any rack on occasion an additional increment of motion to transfer.

103. In an adding machine, the combination of a series of pinions, one for each denomination, a series of double racks capable of engaging said pinions on either of two sides for addition or subtraction, means for operating said racks digit-value distances, and means for imparting to any rack on occasion an additional increment of motion to transfer.

104. In an adding machine, the combination of a series of register wheels, a shaft on which said wheels are directly journaled, a series of pawls, one for each wheel and each spring-pressed into contact with said shaft, a series of notches in said shaft normally out of the paths of said pawls, means for moving the shaft endwise to bring said notches into the paths of said pawls, and means for turning the shaft to turn all of said register wheels to zero by the co-operation of said pawls and notches.

105. In an adding machine, the combination of a series of register wheels, a shaft on which said wheels are directly-journaled, a cam mounted on said shaft, a pin co-operating with said cam, means for rotating the shaft, said cam and pin co-operating when the shaft is rotated to move the shaft endwise, and means for coupling the several register wheels to the shaft to turn said register wheels to zero when said shaft is moved endwise.

106. In an adding machine, the combination of a register comprising a series of register wheels, a frame in which said wheels are mounted, drivers for said register wheels, means for moving said frame to bring said register wheels into or out of gear with said drivers, means for setting the register wheels to zero, and an interlock between said zero-setting means and said frame moving means.

107. In an adding machine, the combination of a series of register wheels, a shaft on which said register wheels are mounted, a movable frame in which said shaft is mounted, means for moving said shaft endwise and for rotating it to set the register wheels to zero, and means for preventing said frame from moving when said shaft is thus moved endwise.

108. In an adding machine, the combination of a series of register wheels, a shaft on which said register wheels are mounted, a movable frame in which said shaft is mounted, means for moving said shaft endwise and for rotating it to set the register wheels to zero, a disk on said shaft, and an abutment on the stationary framework, said abutment and disk being adapted to prevent said shaft from moving endwise when the register frame is out of normal position and said parts adapted to prevent motion of the register frame from normal position when said shaft is moved lengthwise.

109. In an adding machine, the combination of a series of register wheels, a rotatable shaft on which said register wheels are mounted, a crank for rotating said shaft to set the register wheels to zero, drivers for said register wheels, a movable frame in which said register wheels are mounted, and an interlock to prevent the pressure on said crank from depressing the register frame when said crank is operated, said interlock being brought into operation by said crank.

110. In a combined typewriting and adding machine, the combination with typewriting mechanism adapted to print any words or numbers, of adding mechanism for automatically adding numbers printed on said typewriting mechanism, said adding mechanism including a series of registering elements, one for each denomination, transfer devices for transferring from one registering element to another across the register, and split-register devices arranged to render certain of said transfer devices inoperative.

111. In a combined typewriting and adding machine, the combination with typewriting mechanism adapted to print any words or numbers, of adding mechanism for automatically adding numbers printed on said typewriting mechanism, said adding mechanism including a series of registering elements, one for each denomination, spring actuated transfer devices for transferring from one registering element to another across the register, and split-register devices including a stop or stops that can be moved into position to prevent operation of certain of said transfer devices.

112. In an adding machine, the combination of a series of register wheels, a series of racks for operating said register wheels, means for imparting to any one of said racks on occasion an additional increment of motion to transfer, and means for splitting the machine comprising one or more abutments that can be interposed into the path of one or more of said bars and thus prevent transfer by the particular bar or bars affected.

113. The combination with a typewriter carriage, of a rack upon said carriage forming part of a tabulator mechanism, members adjustable on said rack, certain of said members having lugs, a latch or hook, means to cause the hook to engage the lugs, means dependent on the movement of the carriage for causing said hook to release the lugs in succession, and computing mechanism including a part having a denomination selecting movement, said part being connected to said hook.

114. The combination with a typewriter carriage, of a latch or hook connected to a traveling member of a computing mechanism, means for effecting fine adjustments between said traveling member and said latch or hook, and means for automatically disconnecting said latch or hook from and re-connecting it to said carriage.

115. In an adding machine, the combination of a series of register wheels, a series of toothed drivers, one for each register wheel, a series of longitudinally movable bars, one for each of said drivers, means for operating said bars in accordance with the digits of a number and in the same direction for addition and subtraction, and means whereby said bars control the rotary motion of said drivers in one direction for addition and in the other direction for subtraction.

116. In an adding machine, the combination of keys, motor operated denominational members controlled by said keys, and means for preventing the depression of a second key until the motor operated member controlled by a preceding key depression has been fully operated.

117. In an adding machine, the combination of keys, denominational members operated under the control of said keys by power other than that applied to the keys, and means for locking said keys momentarily against a second key operation in order to insure sufficient time between key strokes to allow a complete operation of the denominational member by said power.

118. The combination with a typewriter carriage, of a rack upon said carriage, typewriter-tabulating stops adjustable along said rack, certain of said stops having lugs, a latch or hook, means to cause the hook to engage the lugs, means dependent upon the movement of the carriage for causing said hook to release the lugs in succession, a master wheel, a gang of computing wheels, and means connected to said hook to effect relative traveling movement between said master wheel and said gang of computing wheels.

119. The combination with a typewriter carriage, of tabulating mechanism including tabulating stops having lugs, a latch or hook, means to cause the latch or hook to engage any of the lugs, means depending upon the movement of the carriage to cause the latch or hook to release any engaged lug, and computing mechanism including parts connected to said latch or hook.

120. The combination with a typewriter carriage, of tabulating mechanism including tabulating stops having lugs, a latch or hook, means for causing the latch or hook to engage and release the lugs in succession, a lever pivoted between its ends and connected at one end to said latch or hook, and computing mechanism including parts connected to the other end of said lever.

121. In a combined typewriting and adding machine, the combination with keys including numeral keys, printing instrumentalities controlled by said keys, and adding mechanism mounted beneath the typewriter mechanism, of push links extending from the numeral keys down into said adding mechanism, devices operated by said push links, and means for effecting a relative displacement of said links and said devices so that when said links are operated they will not operate said devices.

122. In an adding machine, the combination of a register including register wheels, drivers for said register wheels normally out of gear with said register wheels, means for actuating said drivers to set up a number to be added, and operating mechanism comprising means for first bringing said register wheels and drivers into gear and holding them in gear, for then operating said drivers in accordance with the number set up and for then moving said register wheels and drivers out of gear, all in one operation of said operating mechanism.

123. The combination with a typewriter carriage, of a rack connected to said carriage and forming part of a tabulator mechanism, members adjustable on said rack, certain of said members having lugs, a latch or hook, means to cause the hook to engage the lugs, means dependent on the movement of the carriage for causing said hook to release the lugs in succession, and computing mechanism including a part having a denomination-selecting movement, said part being connected to said hook.

124. In a combined typewriting and computing machine, the combination with a traveling carriage and a tabulating rack connected thereto, of lugs settable on said rack, a latch or hook, means for holding said latch or hook normally in the path of said lugs, denomination-selecting means connected to said hook, and means for disconnecting said hook from a lug at the end of a computing zone.

Signed at Grand Rapids in the county of Kent and State of Michigan this ninth day of December A. D. 1909.

GLENN J. BARRETT.

Witnesses:
CHARLES P. SHEPHERD,
CHARLES D. REEVE.